US012698763B2

(12) United States Patent
Scalia, Jr.

(10) Patent No.: US 12,698,763 B2
(45) Date of Patent: Aug. 4, 2026

(54) COAL ASH THERMAL BATTERY

(71) Applicant: SCALIA TECHNOLOGIES, LLC,
Dawsonville, GA (US)

(72) Inventor: William Henry Scalia, Jr.,
Dawsonville, GA (US)

(73) Assignee: Scalia Technologies, LLC,
Dawsonville, GA (US)

( * ) Notice: Subject to any disclaimer, the term of this
patent is extended or adjusted under 35
U.S.C. 154(b) by 0 days.

(21) Appl. No.: 18/907,070

(22) Filed: Oct. 4, 2024

(65) Prior Publication Data

US 2025/0129773 A1     Apr. 24, 2025

Related U.S. Application Data

(60) Provisional application No. 63/545,076, filed on Oct.
20, 2023.

(51) Int. Cl.
F03G 7/06 (2006.01)
H01M 6/36 (2006.01)
H01M 6/50 (2006.01)

(52) U.S. Cl.
CPC ........... F03G 7/0641 (2021.08); H01M 6/36
(2013.01); H01M 6/5038 (2013.01); H01M
2220/10 (2013.01)

(58) Field of Classification Search
CPC ... F03G 7/06401; H01M 6/36; H01M 6/5038;
H01M 2220/10; Y02E 60/14
See application file for complete search history.

(56) References Cited

U.S. PATENT DOCUMENTS

| | | | |
|---|---|---|---|
| 4,234,782 A | * | 11/1980 | Barabas ............... G05D 23/275 |
| | | | 392/350 |
| 4,765,143 A | | 8/1988 | Crawford et al. |
| 6,957,536 B2 | * | 10/2005 | Litwin .................... F03G 6/071 |
| | | | 60/641.11 |
| 9,038,390 B1 | | 5/2015 | Kreuger |
| 9,394,807 B1 | | 7/2016 | Kreuger |
| 9,926,814 B2 | | 3/2018 | Roh et al. |
| 10,465,565 B2 | | 11/2019 | Spiry et al. |
| 10,895,173 B2 | | 1/2021 | Hammond |
| 2009/0173337 A1 | * | 7/2009 | Tamaura ................... F03G 6/00 |
| | | | 126/684 |
| 2010/0024421 A1 | * | 2/2010 | Litwin ..................... F02C 1/05 |
| | | | 60/641.8 |

(Continued)

FOREIGN PATENT DOCUMENTS

| | | | |
|---|---|---|---|
| AU | 2001261910 | | 11/2005 |
| CN | 204212934 U | * | 3/2015 |

(Continued)

OTHER PUBLICATIONS

Sonal Patel, "What Are Supercritical CO2 Power Cycles?", Power,
Apr. 1, 2019.

*Primary Examiner* — Matthew T Largi
(74) *Attorney, Agent, or Firm* — Barnes & Thornburg
LLP

(57) ABSTRACT
A thermal energy system includes a heat source configured
to produce heat, a device configured to use the heat produced
by the heat source to produce energy, and a thermal battery
configured to store the heat produced by the heat source and
transfer the heat to the device for use by the device. The
thermal battery includes a thermal-storage mass having coal
ash.

13 Claims, 12 Drawing Sheets

(56)                    References Cited

U.S. PATENT DOCUMENTS

| | | | | |
|---|---|---|---|---|
| 2017/0254229 A1* | 9/2017 | Fletcher | ................. | F02C 1/105 |
| 2018/0038353 A1* | 2/2018 | Xiao | ........................ | F03G 6/04 |
| 2020/0212841 A1* | 7/2020 | Jain | ........................ | F24S 23/70 |
| 2022/0403759 A1* | 12/2022 | Stapp, III | ................ | F01K 13/00 |

FOREIGN PATENT DOCUMENTS

| | | | | |
|---|---|---|---|---|
| CN | 104533556 | | 4/2015 | |
| CN | 114776408 A | * | 7/2022 | ............. F01D 15/10 |
| CN | 114991898 | | 9/2022 | |
| EP | 2878645 | | 3/2019 | |
| WO | 20220166381 | | 8/2022 | |
| WO | 20220166384 | | 8/2022 | |
| WO | 20220166387 | | 8/2022 | |

* cited by examiner

SOURCE

COAL ASH THERMAL BATTERY

PRIORITY CLAIM

This application claims benefit of U.S. provisional patent application No. 63/545,076, filed Oct. 20, 2023, entitled COAL ASH THERMAL STORAGE SYSTEM, the disclosure of which is incorporated by reference in its entirety herein.

BACKGROUND

The present disclosure relates to energy storage, and particularly to thermal energy storage. More particularly, the present disclosure relates to systems and methods for storing thermal energy and using that energy to produce work.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In illustrative embodiments, the present disclosure provides a thermal energy system. The thermal energy system includes a heat source configured to produce heat, a device configured to use the heat produced by the heat source to produce energy, and a thermal battery configured to store the heat produced by the heat source and transfer the heat to the device for use by the device. The thermal battery includes a thermal-storage mass configured to store heat from the heat source, a thermal-input system configured to input the heat into the thermal-storage mass for storage in the thermal-storage mass, and a thermal-output system configured to output the heat from the thermal-storage mass to the device. In some embodiments, the thermal-storage mass includes coal ash.

In illustrative embodiments, the present disclosure provides a thermal battery. The thermal battery includes a thermal-storage mass and configured to store heat from a heat source, a conduit extending through the thermal-storage mass, and a working fluid contained in the conduit and configured to transfer heat to or from the thermal-storage mass. In some embodiments, the thermal-storage mass consists of or consists essentially of coal ash.

In illustrative embodiments, the present disclosure provides a method of storing and using energy. The method includes heating coal ash to provide heated coal ash, circulating a working fluid through the heated coal ash to provide heated working fluid, and producing energy using the heated working fluid.

Other features will become apparent upon reading the following detailed description of certain exemplary embodiments, when taken in conjunction with the appended claims.

BRIEF DESCRIPTION OF THE DRAWINGS

The drawings disclose exemplary embodiments in which like reference characters designate the same or similar parts throughout the figures of which.

DETAILED DESCRIPTION

Figure 1:
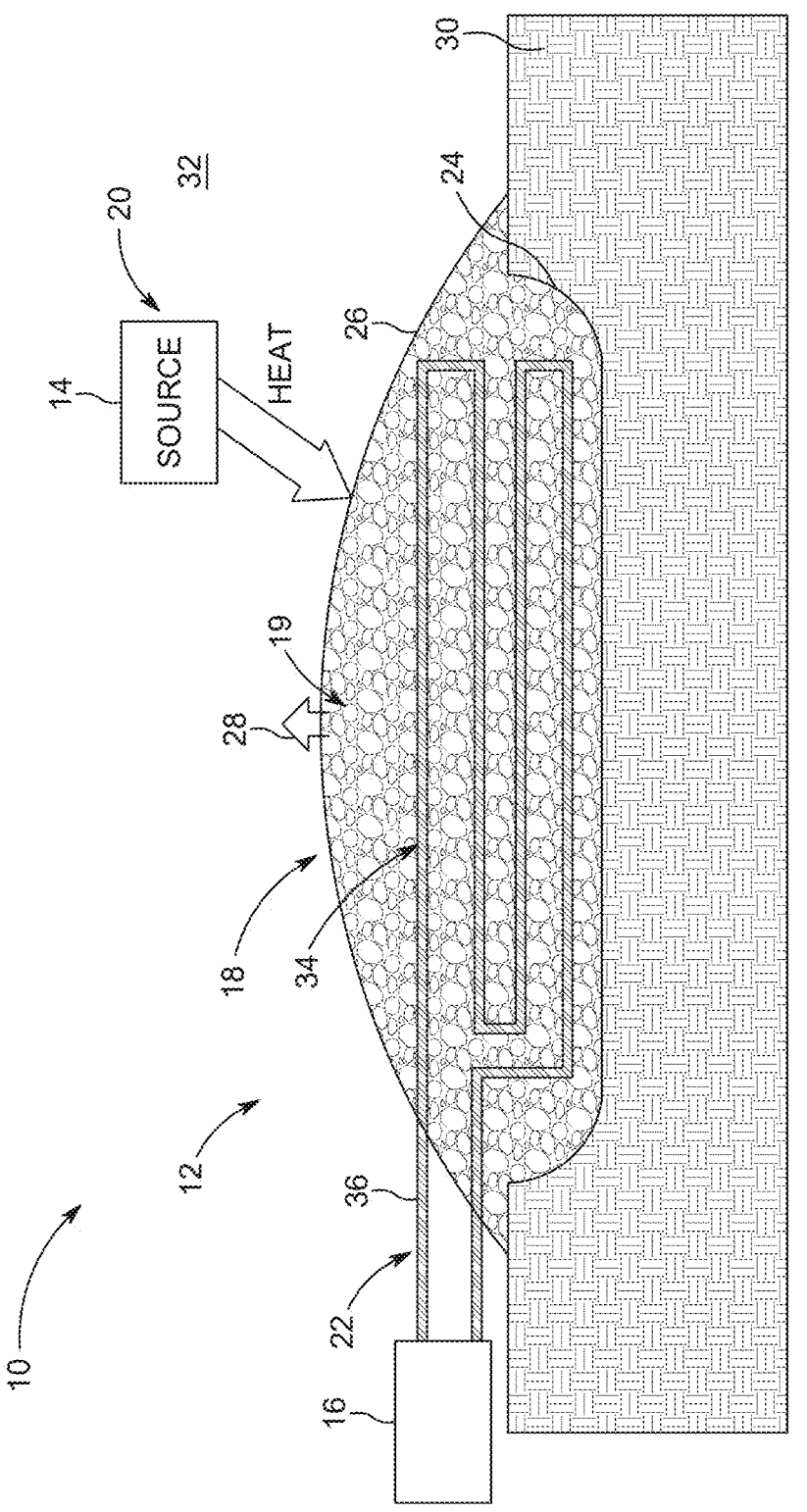
FIG. 1 is a diagrammatic view of a thermal energy system including an in ground coal ash thermal battery, in accordance with aspects of the present disclosure.

A thermal energy system 10 includes a thermal battery 12 configured to receive and store heat from a heat source 14 and then use the heat in a device 16 as shown in FIG. 1. The thermal battery 12 includes a thermal-storage mass 18 including coal ash produced as a byproduct by coal-fired power plants, for example. In illustrative embodiments, the device 16 is configured to use the heat produced by the heat source 14 to produce energy. The energy can be used to produce electricity, to heat a fluid or another device, or to produce any other type of work. The heat can be stored in the thermal-storage mass 18 for long periods of time (i.e. hours, days, weeks, etc.) and thermal battery 12 can be activated to use that heat even when heat from the heat source 14 is not available.

In the illustrative embodiment, the thermal battery 12 includes the thermal-storage mass 18, a thermal-input system 20, and a thermal-output system 22 as shown in FIG. 1. The thermal-input system 20 is configured to input heat into the thermal-storage mass 18 for storage in the thermal-storage mass 18. In the embodiment shown in FIG. 1, the thermal-input system 20 can include or be coupled to the heat source 14 and/or any intervening components or devices used to transfer heat from the heat source 14 to the thermal-storage mass 18. For example, the thermal-input system can include direct or indirect sunlight, heat from the earth, or any other natural heat source and any photovoltaic cells, mirrors, reflectors, conductors, pipes, conduits, fluids (liquids and/or gases), etc. used to transfer the heat from the heat source 14 to the thermal-storage mass 18. The thermal-output system 22 is configured to output the heat from the thermal-storage mass 18 to the device 16 where it is used to produce work.

In the illustrative embodiment shown in FIG. 1, the thermal-storage mass 18 includes coal ash 19. The coal ash 19 is piled together in a coal ash landfill which can be many acres wide and dozens of feet deep. For example, the coal ash landfill can be over 50, 75, or 100 acres in size and at least 10, 20, 30, 40 or 50 feet deep. The thermal-storage mass 18 may further include a bottom liner 24, a top liner 26, and one or more vents 28. The bottom liner 24 is located at a bottom of the coal ash landfill to reside between earth 30 and the coal ash 19. The top liner 26 is located on top of the coal ash 19 to reside between the coal ash and atmosphere 32. The bottom liner 24 and the top liner 26 may encapsulate the coal ash 19 to block ingress of substances other than coal ash 19 and egress of the coal ash 19 into the earth 30 and the atmosphere 32. The one or more vents 28 are coupled to the top liner 26 and allow moisture, heat, and/pressure to be removed from the coal ash.

The thermal-output system 22 includes a conduit 34 and a working fluid 36 as shown in FIG. 1. The conduit 34 is routed through the coal ash 19 and includes first and second ends coupled to the device 16 to form a circuit. The working fluid 36 is configured to circulate through the circuit formed by the conduit 34. Heat stored in the coal ash 19 is transferred to the working fluid 36 and the heated working fluid 36 is then carried to the device 16 and used by the device 16 to produce work. For example, the device 16 may be a motor/generator that uses the heated working fluid 36 to induce motion of at least a portion thereof and produce electricity. In other embodiments, the device 16 can be a manifold or valve(s) and the working fluid 36 can be used to provide or as a hot water source regulated by the manifold or valve(s).

Figure 2:
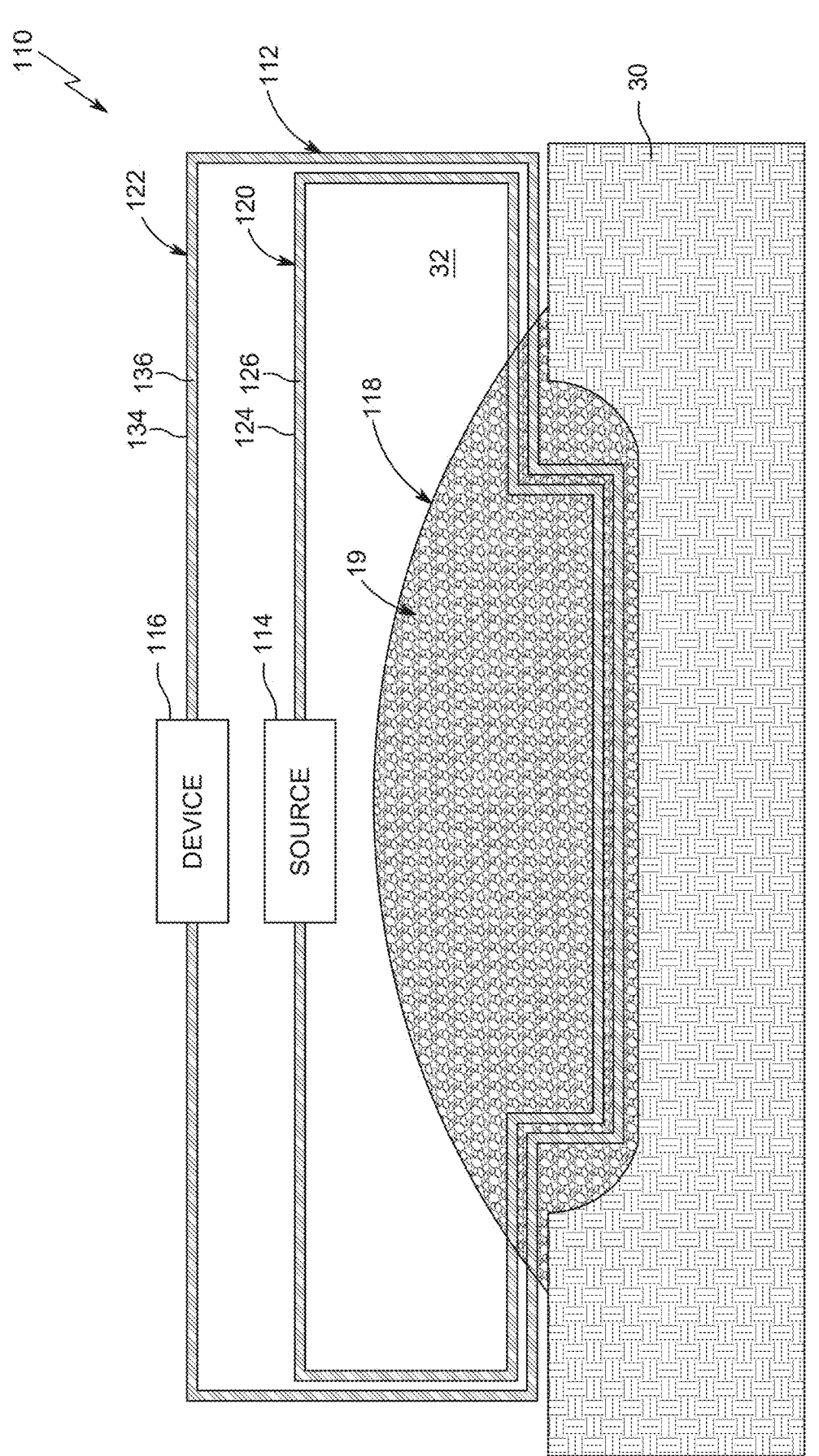
FIG. 2 is a diagrammatic view of another embodiment of a thermal energy system including an in ground coal ash thermal battery, in accordance with aspects of the present disclosure.

Another embodiment of a thermal energy system 110, in accordance with the present disclosure, is shown in FIG. 2. The thermal energy system 110 includes a thermal battery 112 configured to receive and store heat from a heat source 114 and then use the heat in a device 116. The heat source 114 and the device 116 may be the same as heat source 14 and device 16 previously described except for their association with thermal battery 112 which is different than thermal battery 12 as explained below.

In the illustrative embodiment, the thermal battery 112 includes a thermal-storage mass 118, a thermal-input system 120, and a thermal-output system 122. In the illustrative embodiment shown in FIG. 2, the thermal-storage mass 118 includes coal ash 19 and is the same as the thermal-storage mass 118 previously described. The thermal-input system 120 is configured to input heat from the heat source 114 into the thermal-storage mass 118 for storage in the thermal-storage mass 118. The thermal-output system 122 is configured to output the heat from the thermal-storage mass 118 to the device 116 where it is used to produce work.

The thermal-input system 120 includes a conduit 124 coupled to the heat source 114 and extending through the thermal-storage mass 118 and a working fluid 126 contained within the conduit 124 as shown in FIG. 2. The working fluid 126 is heated by the heat source 114 and travels away from the heat source 114 into the thermal-storage mass 118 where it transfers the heat into the thermal-storage mass 118. The working fluid 126 may be returned to the heat source 114 where it can be reheated and circulated again to the thermal-storage mass 118. The conduit 124 is configured to circulate the working fluid 126 through the thermal-storage mass and back to the source 114. One or more regulators, compressors, valves, and/or additional devices can be coupled to the conduit 124 to regulate pressure, flow, or other properties of the working fluid 126.

The thermal-output system 122 includes a conduit 134 and a working fluid 136 as shown in FIG. 2. The conduit 134 is routed through the coal ash 19 separately from conduit 124 and includes first and second ends coupled to the device 116 to form a circuit. The working fluid 136 is configured to circulate through the circuit formed by the conduit 134. Heat stored in the coal ash 19 is transferred to the working fluid 136 and is heated. The heated working fluid 136 is then carried to the device 116 and used by the device 116 to produce work. For example, the device 116 may be a motor/generator that uses the heated working fluid 136 to induce motion of at least a portion thereof and produce electricity. In other embodiments, the device 116 can be a manifold or valve(s) and the working fluid 136 can be used to provide or as a hot water source regulated by the manifold or valve(s).

Figure 3:
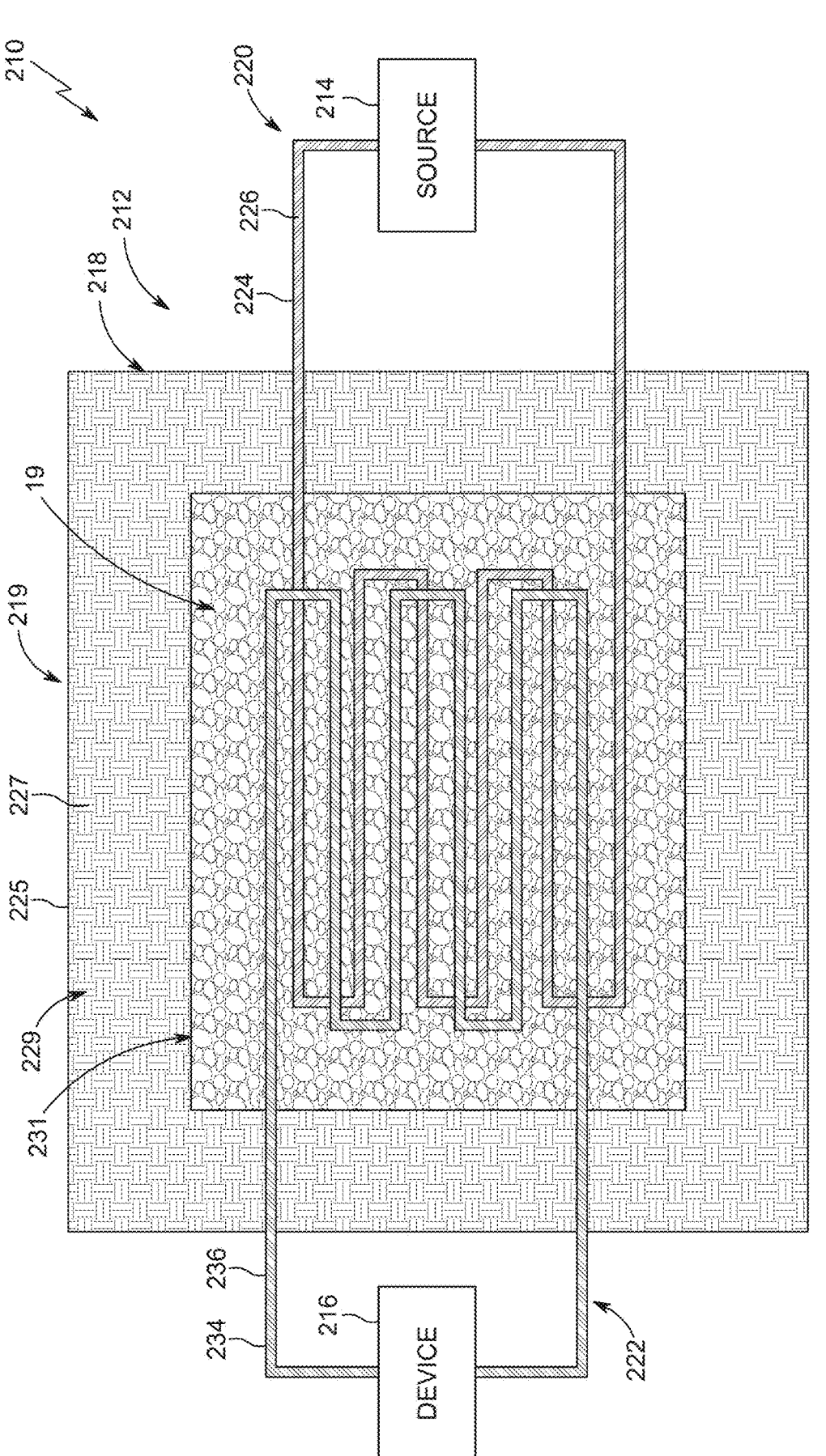
FIG. 3 is a diagrammatic view of another embodiment of a thermal energy system including a coal ash thermal battery contained in a container, in accordance with aspects of the present disclosure.

A first alternative embodiment of a thermal energy system 210, in accordance with the present disclosure, is shown in FIG. 3. The thermal energy system 210 includes a thermal battery 212 configured to receive and store heat from a heat source 214 and then use the heat in a device 216. The heat source 214 and the device 216 may be the same as heat source 14 and device 16 previously described except for their association with thermal battery 212 which is different than thermal battery 12 as explained below.

In the illustrative embodiment shown in FIG. 3, the thermal battery 212 includes a thermal-storage mass 218, a thermal-input system 220, and a thermal-output system 222. In the illustrative embodiment shown in FIG. 3, the thermal-storage mass 218 includes coal ash 19 and a housing 219 surrounding the coal ash 19 to enclose the coal ash in a container. The thermal-input system 220 is configured to input heat from the heat source 214 into the thermal-storage mass 218 for storage in the thermal-storage mass 218. The thermal-output system 222 is configured to output the heat from the thermal-storage mass 218 to the device 216 where it is used to produce work.

The housing 219 of the thermal-storage mass 218 includes a foundation 225 and an insulation layer 227. The foundation 225 provides structural support for the housing 219 and defines a housing interior 229. The insulation layer 227 lines interior surfaces of the foundation 225 within the housing interior 229 and at least partially defines an interior compartment 231 within the housing interior 229. The coal ash 19 is located within the interior compartment 231 formed by the insulation layer 227. The insulation layer 227 is configured to increase thermal insulation and reduce heat losses from the coal ash 19. Any thermal-storage mass described herein can include the housing 219.

The thermal-input system 220 includes a conduit 224 coupled to the heat source 214 and extending through the thermal-storage mass 218 and a working fluid 226 contained within the conduit 224 as shown in FIG. 3. The working fluid 226 is heated by the heat source 214 and travels away from the heat source 214 into the thermal-storage mass 218 where it transfers the heat into the thermal-storage mass 218. The working fluid 226 may be returned to the heat source 214 where it can be reheated and circulated again to the thermal-storage mass 218. The conduit 224 is configured to circulate the working fluid 226 through the thermal-storage mass and back to the source 214. One or more regulators, compressors, valves, and/or additional devices can be coupled to the conduit 224 to regulate pressure, flow, or other properties of the working fluid 226.

The thermal-output system 222 includes a conduit 234 and a working fluid 236 as shown in FIG. 3. The conduit 234 is routed through the coal ash 19 separately from conduit 224 and includes first and second ends coupled to the device 216 to form a circuit. The working fluid 236 is configured to circulate through the circuit formed by the conduit 234. Heat stored in the coal ash 19 is transferred to the working fluid 236 and is heated. The heated working fluid 236 is then carried to the device 216 and used by the device 216 to produce work. For example, the device 216 may be a motor/generator that uses the heated working fluid 236 to induce motion of at least a portion thereof and produce electricity. In other embodiments, the device 216 can be a manifold or valve(s) and the working fluid 236 can be used to provide or as a hot water source regulated by the manifold or valve(s).

Figure 4:
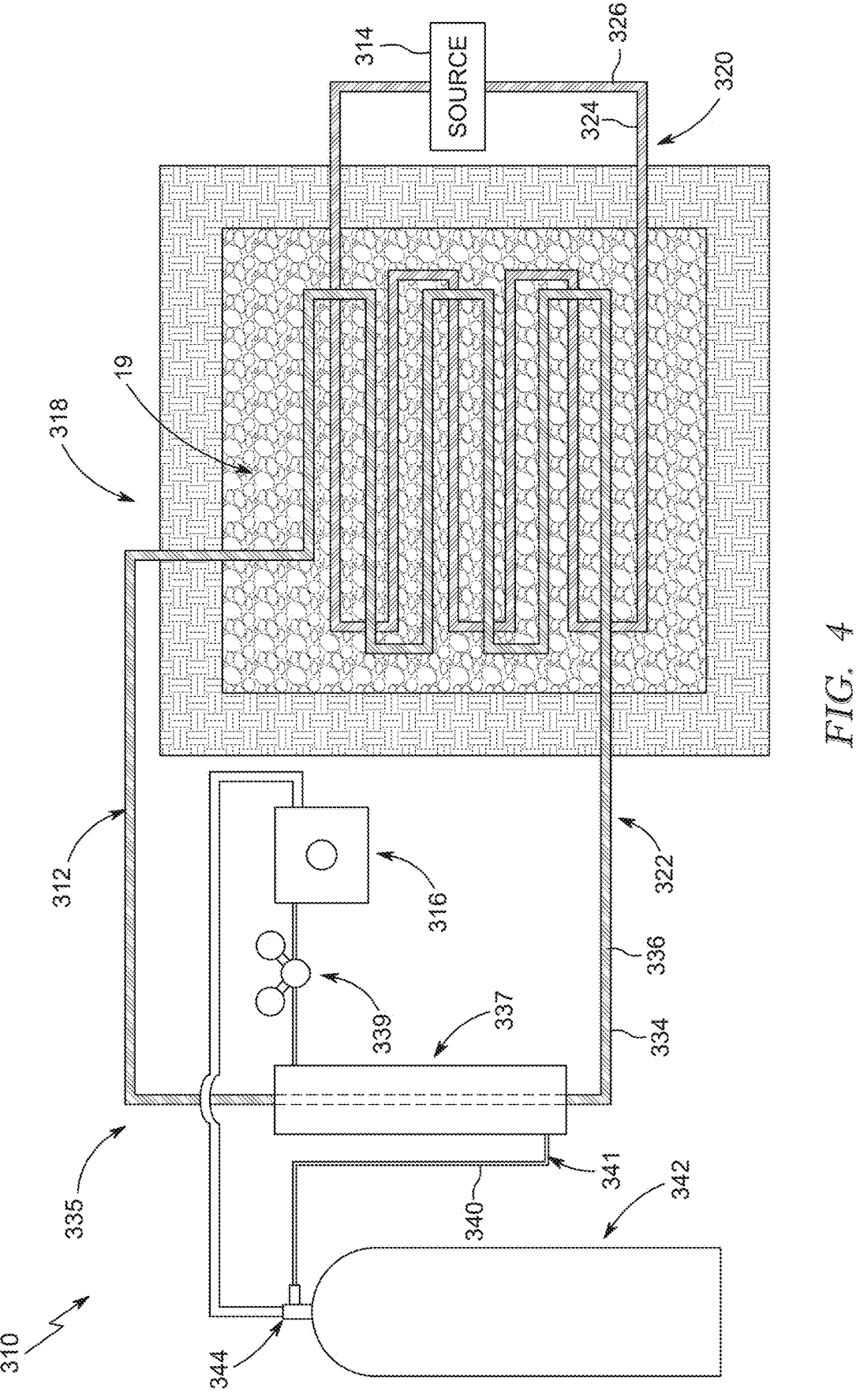
FIG. 4 is a diagrammatic view of another embodiment of a thermal energy system including a coal ash thermal battery, in accordance with aspects of the present disclosure.

A second alternative embodiment of a thermal energy system 310, in accordance with the present disclosure, is shown in FIG. 4. The thermal energy system 310 includes a thermal battery 312 configured to receive and store heat from a heat source 314 and then use the heat in a device 316. The heat source 314 and the device 316 may be the same as heat source 14 and device 16 previously described except for their association with thermal battery 312 which is different than thermal battery 12 as explained below.

In the illustrative embodiment shown in FIG. 4, the thermal battery 312 includes a thermal-storage mass 318, a thermal-input system 320, and a thermal-output system 322. In the illustrative embodiment shown in FIG. 4, the thermal-storage mass 318 includes coal ash 19 and is similar to thermal-storage mass 218. The thermal-input system 320 is configured to input heat from the heat source 314 into the thermal-storage mass 318 for storage in the thermal-storage mass 318. The thermal-output system 322 is configured to output the heat from the thermal-storage mass 318 to the device 316 where it is used to produce work.

The thermal-input system 320 includes a conduit 324 coupled to the heat source 314 and extending through the thermal-storage mass 318 and a working fluid 326 contained within the conduit 324 as shown in FIG. 4. The working fluid 326 is heated by the heat source 314 and travels away from the heat source 314 into the thermal-storage mass 318 where it transfers the heat into the thermal-storage mass 318. The working fluid 326 may be returned to the heat source 314 where it can be reheated and circulated again to the thermal-storage mass 318. The conduit 324 is configured to circulate the working fluid 326 through the thermal-storage mass and back to the source 314. One or more regulators, compressors, valves, and/or additional devices can be coupled to the conduit 324 to regulate pressure, flow, or other properties of the working fluid 326.

The thermal-output system 322 includes a working fluid system 335, a heat exchanger 337, and a fluid regulator 339 as shown in FIG. 4. The working fluid system 335 includes a series of conduits coupled to the device 316, the thermal-storage mass 318, and the heat exchanger 337 to circulate one or more working fluids therebetween. The heat exchanger 337 is configured to exchange heat between a heated working fluid 336 from the thermal-storage mass 318 and a third working fluid 341 coupled in fluid communication with the device 316 to heat the third working fluid 341 for use by the device 316 and produce work. The fluid regulator 339 controls flow of the heated third working fluid 341 to the device 316.

The working fluid system 335 includes a second conduit 334, a second working fluid 336 contained in the second conduit 334, a third conduit 340, a third working fluid 341 contained in the third conduit 340, and a working fluid reservoir 342 as shown in FIG. 4. The second conduit 334 is routed through the coal ash 19 separately from conduit 324 and is coupled to the heat exchanger 337 to form a circuit and deliver the working fluid 336 to the heat exchanger 337. The second working fluid 336 is heated by the coal ash 19 prior to being delivered to the heat exchanger 337. The third conduit 340 circulates the third working fluid 341 from the working fluid reservoir 342 to the heat exchanger 337, to the fluid regulator 339, and to the device 316. The third conduit 340 may circulate the third working fluid 341 back to the working fluid reservoir 342 after being used by the device 316 to produce work.

The second working fluid 336 is stored in the working fluid reservoir 342 and is configured to circulate through the circuit formed by the second conduit 334. The second working fluid 336 is heated by the heat stored in the coal ash 19 before being transported to the heat exchanger 337. The second and third working fluids 336, 341 are delivered to the heat exchanger 337 where the third working fluid 341 is heated by the second working fluid 336 and then output toward the device 316. Flow of the working fluid 341 from the heat exchanger 337 is regulated by temperature and pressure changes and controlled by the regulator 339. For example, the device 316 may be a motor/generator that uses the heated working fluid 341 to induce motion of at least a portion thereof and produce electricity. In other embodiments, the device 316 can be a manifold or valve(s) and the heated working fluid 341 can be used to provide or as a hot water source regulated by the manifold or valve(s).

The working fluid reservoir 342 is configured to contain the third working fluid 341 in a compressed state. A valve 344 is coupled to the working fluid reservoir 342 and is configured to meter release of the third working fluid 341 from the working fluid reservoir 342 to the heat exchanger 337. In the illustrative embodiment, the third working fluid 341 includes carbon dioxide and the carbon dioxide is configured to change from a liquid state in the working fluid reservoir 342 to a gas state in the heat exchanger 337 when heated for use by the device 316 in the gas state. In other embodiments, any suitable working fluid may be used.

Figure 5:
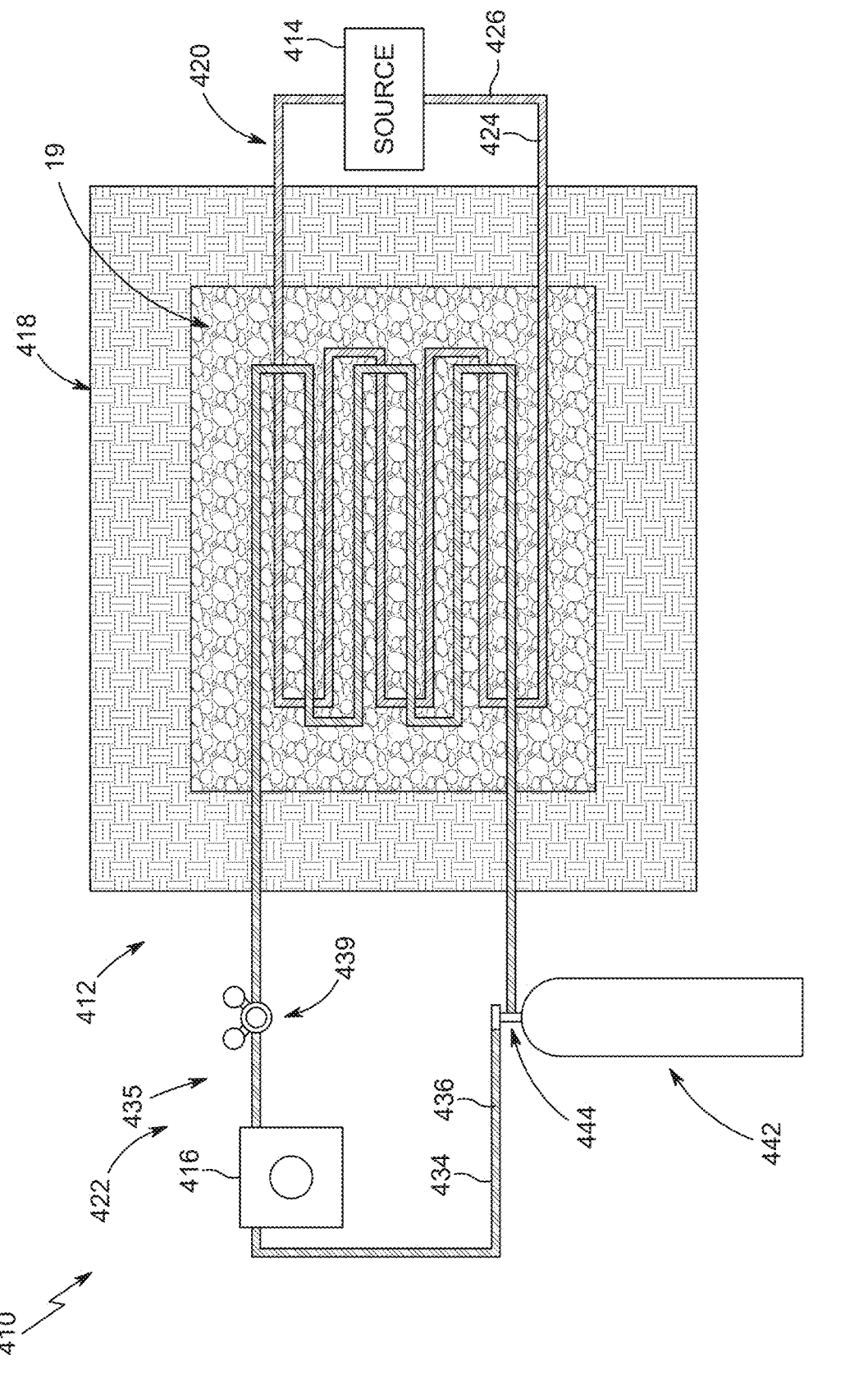
FIG. 5 is a diagrammatic view of another embodiment of a thermal energy system including a coal ash thermal battery, in accordance with aspects of the present disclosure.

A third alternative embodiment of a thermal energy system 410, in accordance with the present disclosure, is shown in FIG. 5. The thermal energy system 410 includes a thermal battery 412 configured to receive and store heat from a heat source 414 and then use the heat in a device 416. The heat source 414 and the device 416 may be the same as heat source 14 and device 16 previously described except for their association with thermal battery 412 which is different than thermal battery 12 as explained below.

In the illustrative embodiment shown in FIG. 5, the thermal battery 412 includes a thermal-storage mass 418, a thermal-input system 420, and a thermal-output system 422. In the illustrative embodiment shown in FIG. 5, the thermal-storage mass 418 includes coal ash 19 and is similar to thermal-storage mass 218. The thermal-input system 420 is configured to input heat from the heat source 414 into the thermal-storage mass 418 for storage in the thermal-storage mass 418. The thermal-output system 422 is configured to output the heat from the thermal-storage mass 418 to the device 416 where it is used to produce work.

The thermal-input system 420 includes a conduit 424 coupled to the heat source 414 and extending through the thermal-storage mass 418 and a working fluid 426 contained within the conduit 424 as shown in FIG. 5. The working fluid 426 is heated by the heat source 414 and travels away from the heat source 414 into the thermal-storage mass 418 where it transfers the heat into the thermal-storage mass 418. The working fluid 426 may be returned to the heat source 414 where it can be reheated and circulated again to the thermal-storage mass 418. The conduit 424 is configured to circulate the working fluid 426 through the thermal-storage mass 418 and back to the source 414. One or more regulators, compressors, valves, and/or additional devices can be coupled to the conduit 424 to regulate pressure, flow, or other properties of the working fluid 426.

The thermal-output system 422 includes a working fluid system 435 and a fluid regulator 439 as shown in FIG. 5. The working fluid system 435 includes a series of conduits coupled to the device 416, the thermal-storage mass 418, and the fluid regulator 429 to circulate one or more working fluids therebetween. The fluid regulator 439 controls flow of heated working fluid from the thermal-storage mass 418 to the device 416.

The working fluid system 435 includes a second conduit 434, a second working fluid 436 contained in the second conduit 434, and a working fluid reservoir 442 as shown in FIG. 5. The second conduit 434 is routed through the coal ash 19 separately from conduit 424. The second conduit 434 is coupled to the device 416, the fluid regulator 439, and the working fluid reservoir 442 to form a circuit and circulate the working fluid 436 therethrough. The second working fluid 436 is heated by the coal ash 19 prior to being output from the coal ash 19. The second working fluid 436 is stored in the working fluid reservoir 442 and is configured to circulate through the circuit formed by the second conduit 434. Flow of the working fluid 436 from the coal ash 19 to the device 416 is regulated by temperature and pressure changes and controlled by the regulator 439. The device 416 may be a motor/generator that uses the heated working fluid 436 to induce motion of at least a portion thereof and produce electricity. In other embodiments, the device 416 can be a manifold or valve(s) and the heated working fluid 441 can be used to provide or as a hot water source regulated by the manifold or valve(s).

The working fluid reservoir 442 is configured to contain the second working fluid 436 in a compressed state. A valve 444 is coupled to the working fluid reservoir 442 and is configured to meter release of the second working fluid 436 from the working fluid reservoir 442 to the coal ash 19 and/or from the device 416 to the working fluid reservoir 442. In the illustrative embodiment, the second working fluid 436 includes carbon dioxide and the carbon dioxide is configured to change from a liquid state in the working fluid reservoir 442 to a gas state in the thermal-storage mass 418 when heated by the coal ash 19 for use by the device 416 in the gas state. In other embodiments, any suitable working fluid may be used.

Figure 6:
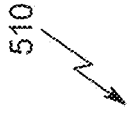
FIG. 6 is a diagrammatic view of another embodiment of a thermal energy system including a coal ash thermal battery, in accordance with aspects of the present disclosure.

A fourth alternative embodiment of a thermal energy system 510, in accordance with the present disclosure, is shown in FIG. 6. The thermal energy system 510 includes a thermal battery 512 configured to receive and store heat from a heat source 514 and then use the heat in a device 516. The heat source 514 and the device 516 may be the same as heat source 14 and device 16 previously described except for their association with thermal battery 512 which is different than thermal battery 12 as explained below.

In the illustrative embodiment shown in FIG. 6, the thermal battery 512 includes a thermal-storage mass 518, a thermal-input system 520, and a thermal-output system 522. In the illustrative embodiment shown in FIG. 6, the thermal-storage mass 518 includes coal ash 19 and is similar to thermal-storage mass 218. The thermal-input system 520 is configured to input heat from the heat source 514 into the thermal-storage mass 518 for storage in the thermal-storage mass 518. The thermal-output system 522 is configured to output the heat from the thermal-storage mass 518 to the device 516 where it is used to produce work.

The thermal-input system 520 includes a conduit 524 coupled to the heat source 514 and extending through the thermal-storage mass 518 and a working fluid 526 contained within the conduit 524 as shown in FIG. 6. The working fluid 526 is heated by the heat source 514 and travels away from the heat source 514 into the thermal-storage mass 518 where it transfers the heat into the thermal-storage mass 518. The working fluid 526 may be returned to the heat source 514 where it can be reheated and circulated again to the thermal-storage mass 518. The conduit 524 is configured to circulate the working fluid 526 through the thermal-storage mass 518 and back to the source 514. One or more regulators, compressors, valves, and/or additional devices can be coupled to the conduit 524 to regulate pressure, flow, or other properties of the working fluid 526.

The thermal-output system 522 includes a working fluid system 535 and a fluid regulator 539 as shown in FIG. 6. The working fluid system 535 includes a series of conduits coupled to the device 516, the thermal-storage mass 518, and the fluid regulator 529 to circulate one or more working fluids therebetween. The fluid regulator 539 controls flow of heated working fluid from the thermal-storage mass 518 to the device 516.

The working fluid system 535 includes a second conduit 534, a second working fluid 536 contained in the second conduit 534, a first working fluid reservoir 542, a second working fluid reservoir 543, and a compressor 546 as shown in FIG. 6. The second conduit 534 is routed through the coal ash 19 separately from conduit 524. The second conduit 534 is coupled to the device 516, the fluid regulator 539, the working fluid reservoirs 542, 543, and the compressor 546 to form a circuit and circulate the working fluid 536 therethrough. The second working fluid 536 is stored in the working fluid reservoirs 542, 543 and is configured to circulate through the circuit formed by the second conduit 534. The second working fluid 536 is heated by the coal ash 19 prior to being output from the coal ash 19. Flow of the working fluid 536 from the coal ash 19 to the device 516 is regulated by temperature and pressure changes and controlled by the regulator 539. The device 516 may be a motor/generator that uses the heated working fluid 536 to induce motion of at least a portion thereof and produce electricity. In other embodiments, the device 516 can be a manifold or valve(s) and the heated working fluid 536 can be used to provide or as a hot water source regulated by the manifold or valve(s).

The working fluid reservoirs 542, 543 are configured to contain the second working fluid 536 in a compressed state. A multi-port valve 544 is coupled to the working fluid reservoirs 542, 543 and is configured to control release of the second working fluid 536 from the working fluid reservoirs 542 to the coal ash 19 and/or from compressor 546 to the working fluid reservoirs 542, 543. In the illustrative embodiment, the second working fluid 536 includes carbon dioxide and the carbon dioxide is configured to change from a liquid state in the working fluid reservoir 542 to a gas state in the thermal-storage mass 518 when heated by the coal ash 19 for use by the device 516 in the gas state. In other embodiments, any suitable working fluid may be used.

The compressor 546 is coupled to the second conduit 534 between the device 516 and the working fluid reservoirs 542, 543. The compressor 546 is configured to change/compress the working fluid 536 from a gas state back to a liquid state after flowing through and being used by the device 516. The compressor 546 is coupled to and powered by a power source 550. In the illustrative embodiment, the power source 550 include a photovoltaic cell array, but in other embodiments the power source 550 can include any suitable power source such as a stand-alone generator or grid power.

The multi-port valve 544 is configured to selectively open and close the working fluid reservoirs 542, 543 to provide means for filling at least one of the working fluid reservoirs 542, 543 with the second working fluid 536 from the compressor 546 and for releasing the second working fluid 536 from at least one of the working fluid reservoirs 542, 543 to the thermal-storage mass 518. For example, the first working fluid reservoir 542 can be filled with compressed working fluid 536 from the compressor 546 while working fluid 536 in the second working fluid reservoir 543 is released to the thermal-storage mass 518. Once one of the working fluid reservoirs 542, 543 is empty, the multi-port valve 544 can be toggled so that the emptied working fluid reservoir begins to fill with the compressed working fluid 536 from the compressor 546 and the other working fluid reservoir begins to release working fluid to the thermal-storage mass 518, and vice versa. In this way, the working fluid system 535 can run continuously to supply the device 516 with heated working fluid 536 at all times. Any number of working fluid reservoirs can be included and operated in this fashion.

Figure 7:
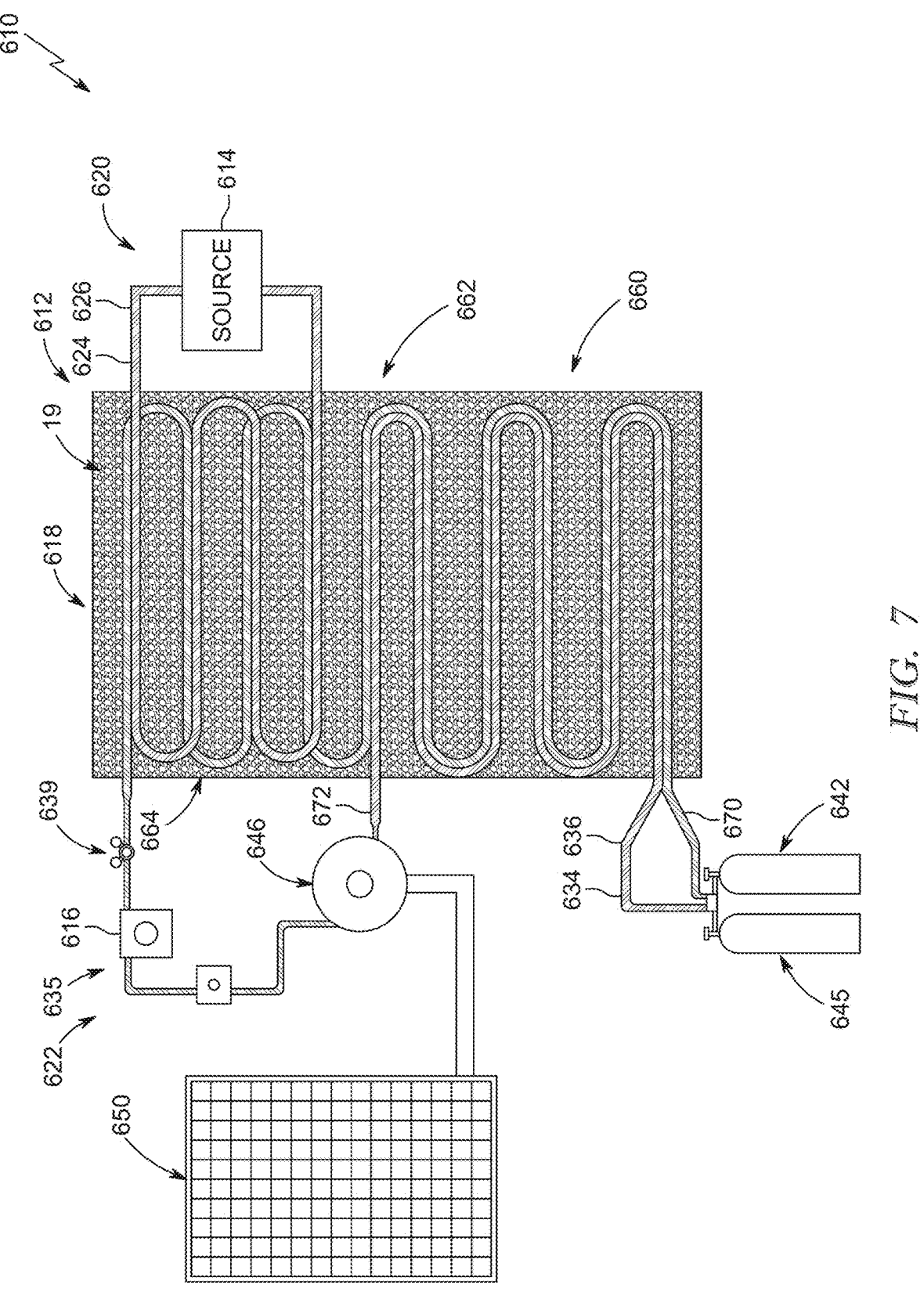
FIG. 7 is a diagrammatic view of another embodiment of a thermal energy system including a coal ash thermal battery, in accordance with aspects of the present disclosure.

A fifth alternative embodiment of a thermal energy system 610, in accordance with the present disclosure, is shown in FIG. 7. The thermal energy system 610 includes a thermal battery 612 configured to receive and store heat from a heat source 614 and then use the heat in a device 616. The heat source 614 and the device 616 may be the same as heat source 14 and device 16 previously described except for their association with thermal battery 612 which is different than thermal battery 12 as explained below.

In the illustrative embodiment shown in FIG. 7, the thermal battery 612 includes a thermal-storage mass 618, a thermal-input system 620, and a thermal-output system 622. In the illustrative embodiment shown in FIG. 7, the thermal-storage mass 618 includes coal ash 19 and is similar to thermal-storage mass 218. The thermal-input system 620 is configured to input heat from the heat source 614 into the thermal-storage mass 618 for storage in the thermal-storage mass 618. The thermal-output system 622 is configured to output the heat from the thermal-storage mass 618 to the device 616 where it is used to produce work.

The thermal-input system 620 includes a conduit 624 coupled to the heat source 614 and extending through the thermal-storage mass 618 and a working fluid 626 contained within the conduit 624 as shown in FIG. 7. The working fluid 626 is heated by the heat source 614 and travels away from the heat source 614 into the thermal-storage mass 618 where it transfers the heat into the thermal-storage mass 618. The working fluid 626 may be returned to the heat source 614 where it can be reheated and circulated again to the thermal-storage mass 618. The conduit 624 is configured to circulate the working fluid 626 through the thermal-storage mass 618 and back to the source 614. One or more regulators, compressors, valves, and/or additional devices can be coupled to the conduit 624 to regulate pressure, flow, or other properties of the working fluid 626.

The thermal-output system 622 includes a working fluid system 635 and a fluid regulator 639 as shown in FIG. 7. The working fluid system 635 includes a series of conduits coupled to the device 616, the thermal-storage mass 618, and the fluid regulator 629 to circulate one or more working fluids therebetween. The fluid regulator 639 controls flow of heated working fluid from the thermal-storage mass 618 to the device 616.

The working fluid system 635 includes a second conduit 634, a second working fluid 636 contained in the second conduit 634, a first working fluid reservoir 642, a second working fluid reservoir 643, and a compressor 646 as shown in FIG. 7. The second conduit 634 is routed through the coal ash 19 separately from conduit 624. The second conduit 634 is coupled to the device 616, the fluid regulator 639, the working fluid reservoirs 642, 643, and the compressor 646 to form a circuit and circulate the working fluid 636 therethrough. The second working fluid 636 is stored in the working fluid reservoirs 642, 643 and is configured to circulate through the circuit formed by the second conduit 634. The second working fluid 636 is heated by the coal ash 19 prior to being output from the coal ash 19. Flow of the working fluid 636 from the coal ash 19 to the device 616 is regulated by temperature and pressure changes and controlled by the regulator 639. The device 616 may be a motor/generator that uses the heated working fluid 636 to induce motion of at least a portion thereof and produce electricity. In other embodiments, the device 616 can be a manifold or valve(s) and the heated working fluid 636 can be used to provide or as a hot water source regulated by the manifold or valve(s).

The working fluid reservoirs 642, 643 are configured to contain the second working fluid 636 in a compressed state. A multi-port valve 644 is coupled to the working fluid reservoirs 642, 643 and is configured to control release of the second working fluid 636 from the working fluid reservoirs 642 to the coal ash 19 and/or from compressor 646 to the working fluid reservoirs 642, 643. In the illustrative embodiment, the second working fluid 636 includes carbon dioxide and the carbon dioxide is configured to change from a liquid state in the working fluid reservoirs 642, 643 to a gas state in the thermal-storage mass 618 when heated by the coal ash 19 for use by the device 616 in the gas state. In other embodiments, any suitable working fluid may be used.

The compressor 646 is coupled to the second conduit 634 between the device 616 and the working fluid reservoirs 642, 643. The compressor 646 is configured to change/compress the working fluid 636 from a gas state back to a liquid state after flowing through and being used by the device 616. The compressor 646 is coupled to and powered by a power source 650. In the illustrative embodiment, the power source 650 include a photovoltaic cell array, but in other embodiments the power source 650 can include any suitable power source such as a stand-alone generator or grid power.

The multi-port valve 644 is configured to selectively open and close the working fluid reservoirs 642, 643 to provide means for filling at least one of the working fluid reservoirs 642, 643 with the second working fluid 636 from the compressor 646 and for releasing the second working fluid 636 from at least one of the working fluid reservoirs 642, 643 to the thermal-storage mass 618. For example, the first working fluid reservoir 642 can be filled with compressed working fluid 636 from the compressor 646 while working fluid 636 in the second working fluid reservoir 643 is released to the thermal-storage mass 618. Once one of the working fluid reservoirs 642, 643 is empty, the multi-port valve 644 can be toggled so that the emptied working fluid reservoir begins to fill with the compressed working fluid 636 from the compressor 546 and the other working fluid reservoir begins to release working fluid to the thermal-storage mass 618, and vice versa. In this way, the working fluid system 635 can run continuously to supply the device 616 with heated working fluid 636 at all times. Any number of working fluid reservoirs can be included and operated in this fashion.

The thermal-storage mass 618 includes a first section 660, a second section 662 spaced apart from the first section 660, and a third section 664 spaced apart from the first section 660 and the second section 662 as shown in FIG. 7. The first conduit 624 extends through the third section 664 to deliver heat to the third section 664. The second conduit 634 includes a first segment 670 and a second segment 672. The first segment 670 extends from the working fluid reservoirs 642, 643 through the first section 660, the second section 662, and the third section 664 to receive heat in the first section 660, the second section 662, and the third section 664. The second segment 672 extends from the compressor 646 into the thermal-storage mass 618 at the second section 662 and through the second section 662 and the first section 660 with the first segment 670 back to the working fluid reservoirs 642, 643. When the second working fluid 636 is compressed by the compressor 646 it is heated, thereby preheating the thermal-storage mass 618 in the first section 660 and second section 662 before refilling one of the working fluid reservoirs 642, 643.

Figure 8:
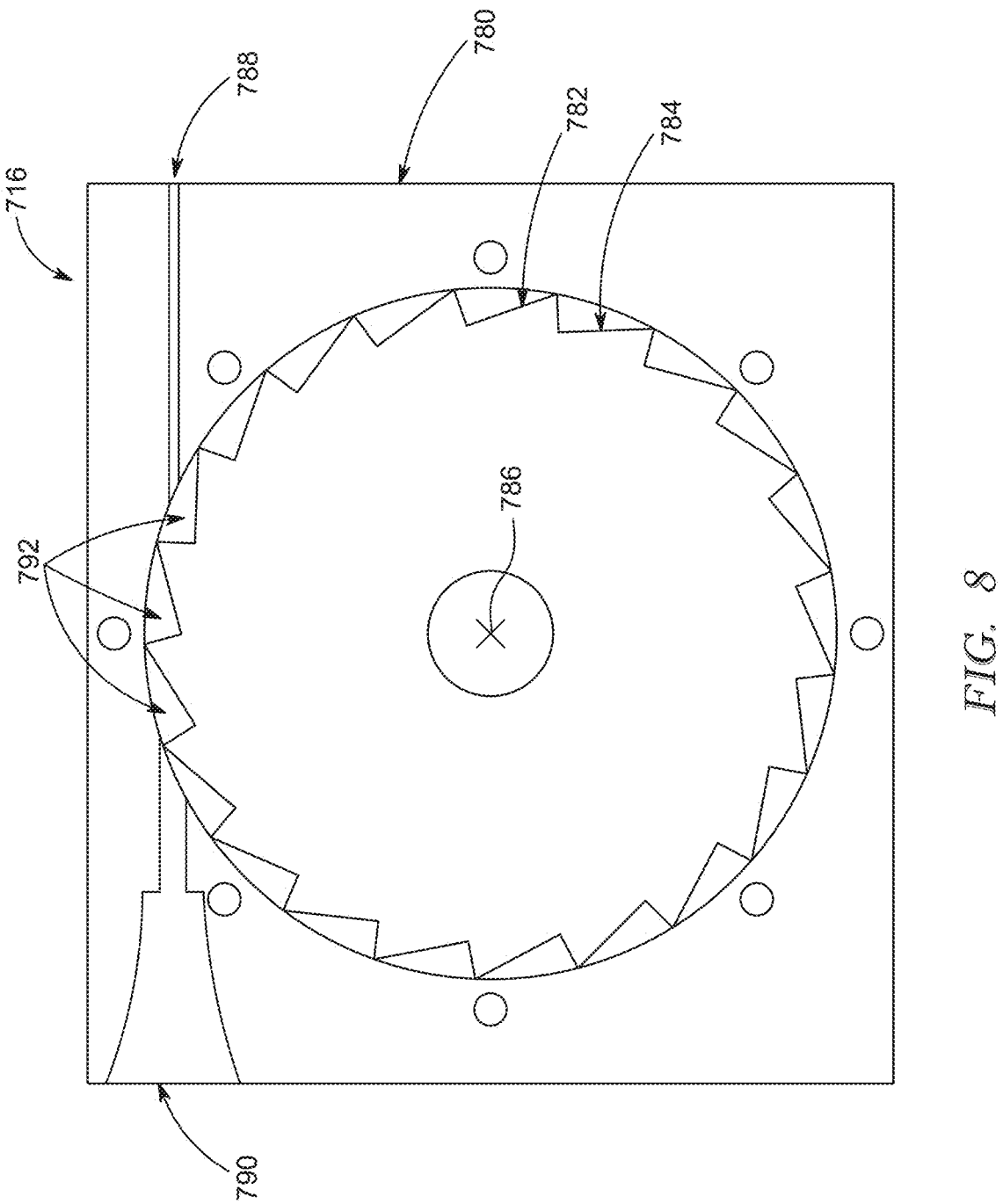
FIG. 8 is a cross section of a motor that can be used with a thermal energy system to generate electricity, in accordance with aspects of the present disclosure.
Figure 9:
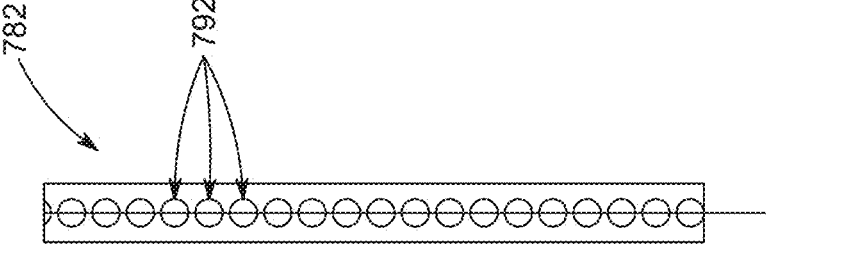
FIG. 9 is a side view of a rotor included in the motor of FIG. 8, in accordance with aspects of the present disclosure.

FIGS. 8 and 9 show one example of a motor 716 that can be used as the device in any of the systems embodiments described herein. The motor 716 includes a housing 780 and a rotor 782. The housing 780 is formed to include an interior cavity 784. The rotor 782 is located within the interior cavity 784 of the housing 780 and is mounted to the housing 780 for rotation about a rotor axis 786.

The housing 780 is also formed to include an inlet 788 leading into the interior cavity 784 and an outlet 790 leading out of the interior cavity 784. Heated working fluid from the coal ash 19 is injected into the interior cavity 784 through the inlet 788 to interact with the rotor 782 before being discharged from the interior cavity 784 to a compressor and/or a working fluid reservoir. The heated working fluid causes the rotor 782 to rotate about the rotor axis 786. The outlet 790 has a greater diameter or outer dimension than the inlet 788. In the illustrative embodiment, at least a portion of the outlet increases in in size as the outlet 790 extends away from the rotor 782.

The rotor 782 may be coupled to a generator to produce electricity in response to rotation about the rotor axis 786. The rotor 782 is formed to include a plurality of holes or bores 792 formed in an outer periphery of the rotor 782. Each of the holes 792 aligns with the inlet 788 during rotation of the rotor 782 about the rotor axis 786. The heated working fluid flows into each hole 792 as it aligns with the inlet 788 and pushes the rotor 782 to rotate about the rotor axis 786.

Any of the conduits described in the systems above and contained within the thermal-storage mass can take on a different shape other than a cylindrical shape. For example, the conduits placed within the coal ash 19 can be designed with features that increase contact surface area between the coal ash 19 and the conduit(s) to increase thermal conductivity therebetween. Generally, greater contact surface area between the coal ash 19 and the conduits corresponds with greater thermal conductivity and, therefore, system efficiency. However, some structures can hinder thermal transfer if they block direct contact of particles of coal ash 19 with portions of the conduits and and/or block the coal ash 19 from surrounding the conduits with a desired density. As an example, if a finned conduit is used, the fins may block the coal ash 19 from reaching the portion of the conduit where the working fluid is contained. This can decrease the effective contact surface area between the coal ash and the conduit as a whole and decrease efficiency of the system. Accordingly, it is an objective of the present disclosure to provide conduits with structures that increase the contact surface area between the conduits as a whole and a volume of the coal ash surrounding the conduits while also allowing the coal ash to be packed to a desired density around the conduits.

Figure 10:
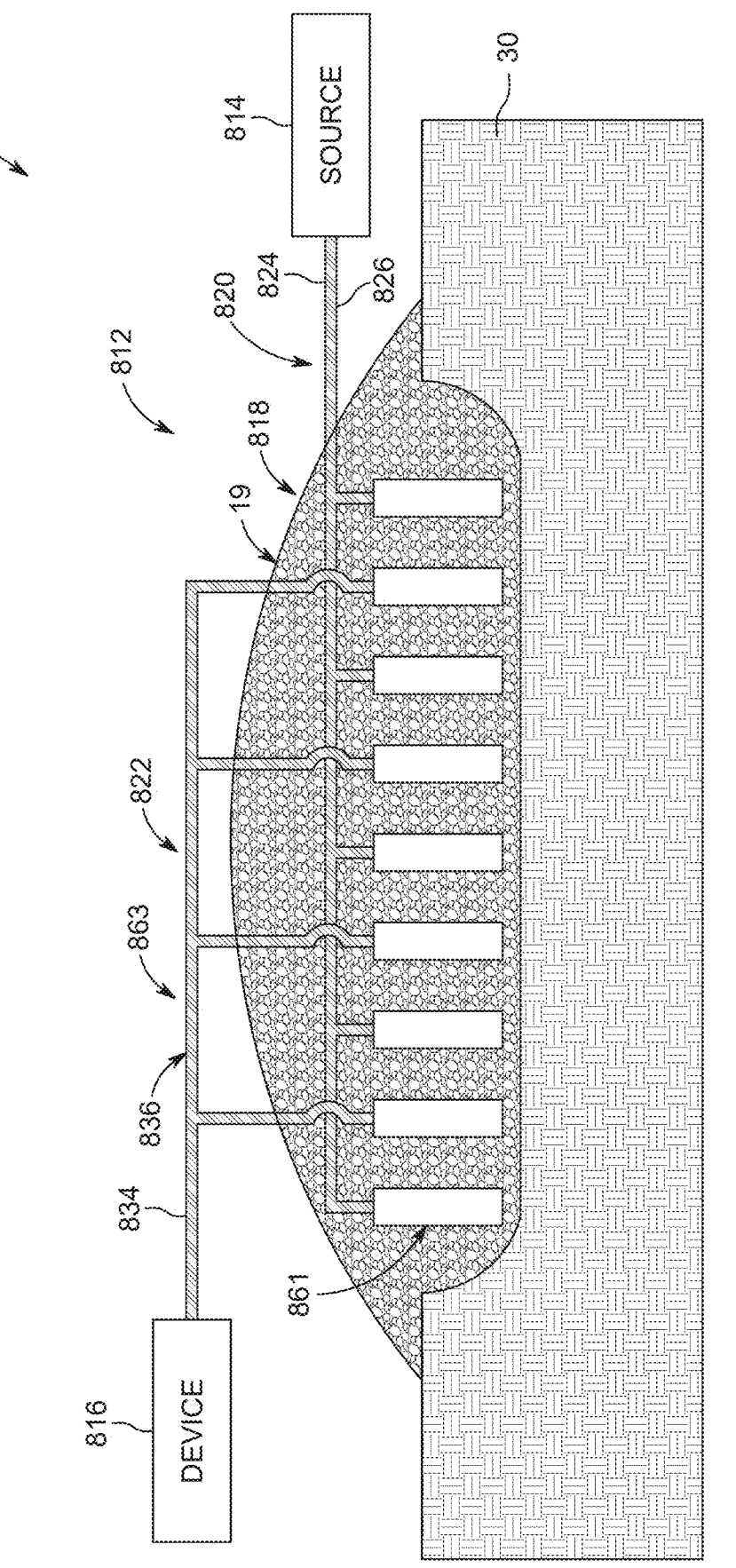
FIG. 10 is a diagrammatic view of another embodiment of a thermal energy system including a coal ash thermal battery, in accordance with aspects of the present disclosure.
Figure 11:
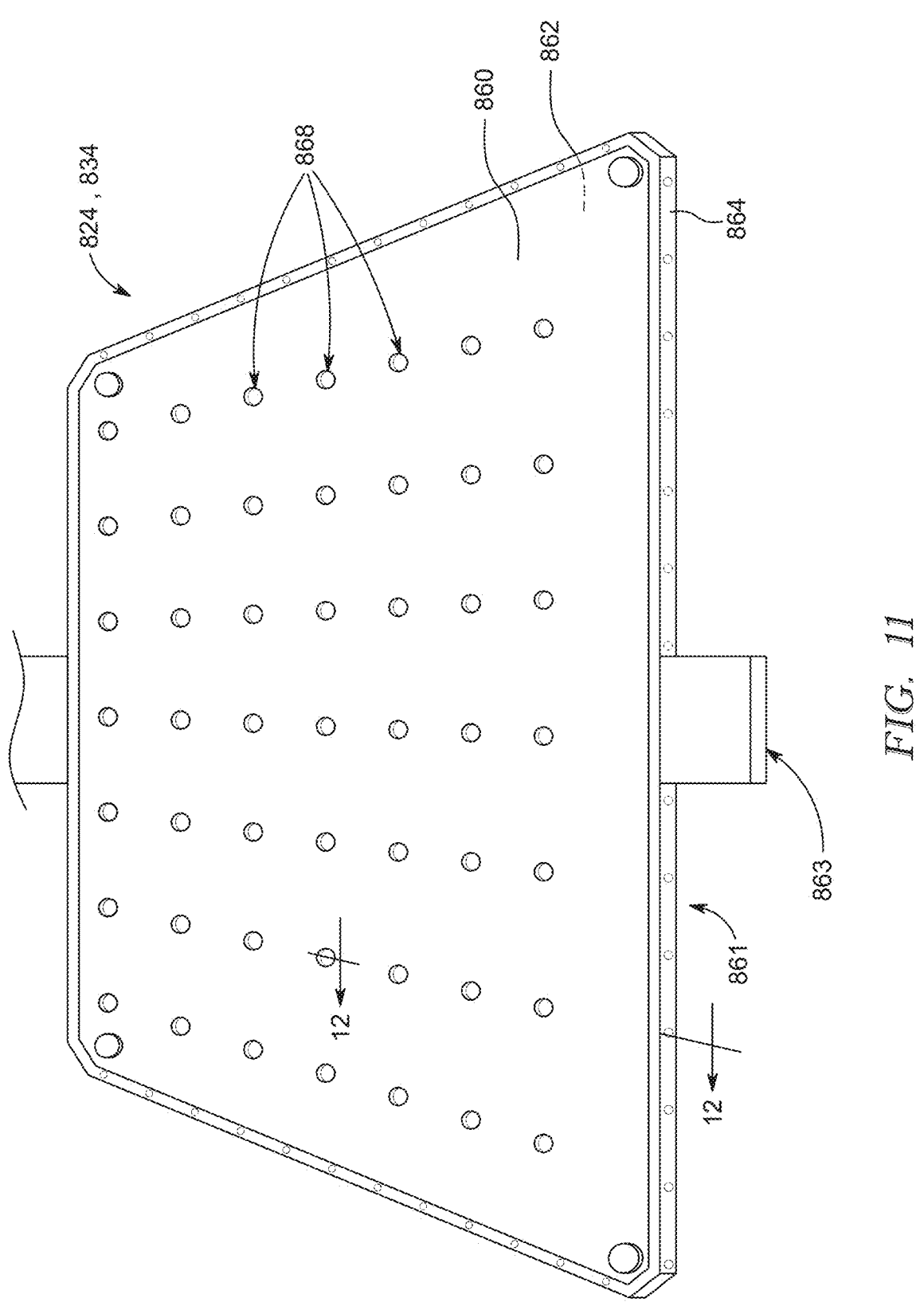
FIG. 11 is a perspective view of a plate-like conduit that can be used in any of the thermal energy systems shown and disclosed herein.
Figure 12:
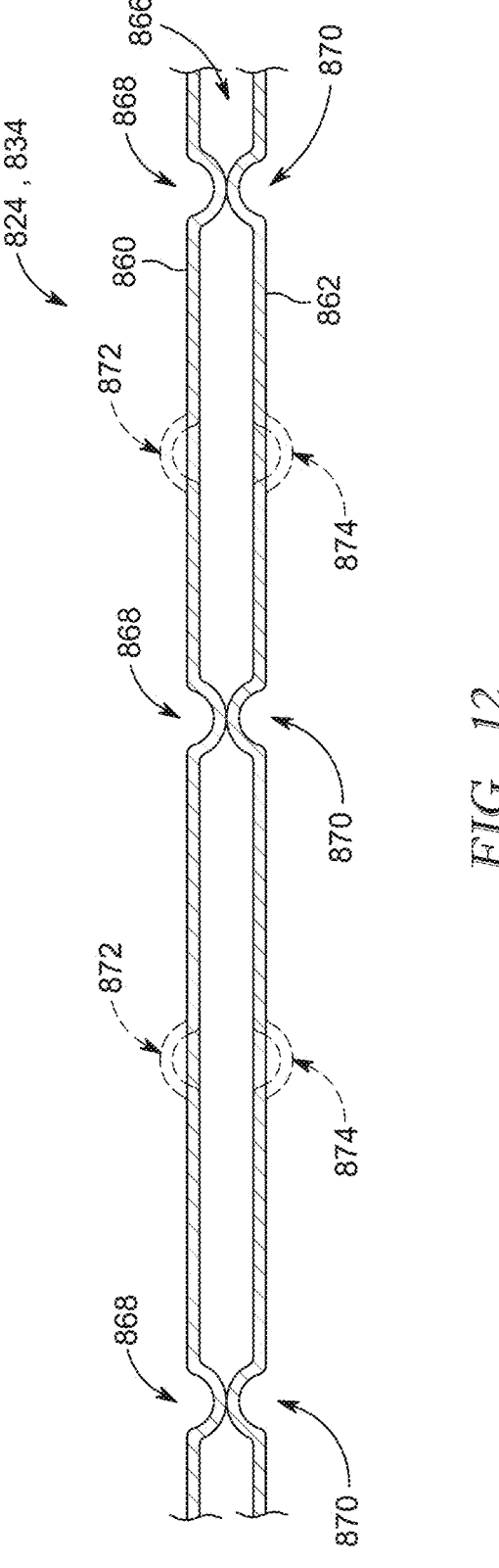
FIG. 12 is a cross section of the plate-like conduit taken along line 12-12 in FIG. 11.

In some embodiments, any of the systems described previously can include plate-like conduits running through the coal ash 19 as shown in FIGS. 10-12. By way of just one example including such conduits, another embodiment of a thermal energy system 810, in accordance with the present disclosure, is shown in FIG. 10. The thermal energy system 810 includes a thermal battery 812 configured to receive and store heat from a heat source 814 and then use the heat in a device 816. The heat source 814 and the device 816 may be the same as heat source 14 and device 16 previously described except for their association with thermal battery 812 which is different than thermal battery 12 as explained below.

In the illustrative embodiment shown in FIG. 10, the thermal battery 812 includes a thermal-storage mass 818, a thermal-input system 820, and a thermal-output system 822. In the illustrative embodiment shown in FIG. 10, the thermal-storage mass 818 includes coal ash 19. The thermal-input system 820 is configured to input heat from the heat source 814 into the thermal-storage mass 818 for storage in the thermal-storage mass 818. The thermal-output system 822 is configured to output the heat from the thermal-storage mass 818 to the device 816 where it is used to produce work.

The thermal-input system 820 includes a first conduit 824 coupled to the heat source 814 and extending through the thermal-storage mass 818 and a working fluid 826 contained within the conduit 824 as shown in FIG. 10. The working fluid 826 is heated by the heat source 814 and travels away from the heat source 814 into the thermal-storage mass 818 where it transfers the heat into the thermal-storage mass 818. The working fluid 826 may be returned to the heat source 814 where it can be reheated and circulated again to the thermal-storage mass 818. The conduit 824 is configured to circulate the working fluid 826 through the thermal-storage mass and back to the source 814. One or more regulators, compressors, valves, and/or additional devices can be coupled to the conduit 824 to regulate pressure, flow, or other properties of the working fluid 826.

The thermal-output system 822 includes a second conduit 834 and a working fluid 836 as shown in FIG. 10. The conduit 834 is routed through the coal ash 19 separately from conduit 824 and includes first and second ends coupled to the device 816 to form a circuit. The working fluid 836 is configured to circulate through the circuit formed by the conduit 834. Heat stored in the coal ash 19 is transferred to the working fluid 836 and is heated. The heated working fluid 836 is then carried to the device 816 through the conduit 834 and used by the device 816 to produce work. For example, the device 816 may be a motor/generator that uses the heated working fluid 836 to induce motion of at least a portion thereof and produce electricity. In other embodiments, the device 816 can be a manifold or valve(s) and the working fluid 836 can be used to provide or as a hot water source regulated by the manifold or valve(s).

The conduits 824, 834 are laid in the coal ash 19 in an alternating relationship such that each conduit 824, 834 is not laid directly adjacent to another of its kind. In this way, heat input into the coal ash 19 by the first conduit 824 travels conductively away from the conduit 824 toward neighboring portions of the second conduit 834 for more efficient heat transfer therebetween. However, in some embodiments, separate portions of each respective conduit 824, 834 can be laid directly next to one another.

Each of the conduits 824, 834 can include an in-ground portion 861 and an above-ground portion 863. The in-ground portion 861 of the conduits 824, 834 is located completely in the coal ash 19 while the above-ground portions 863 extend partially into the coal ash 19 and run outside of the coal ash 19. Each in-ground portion 861 is illustratively formed in the shape of a flat, hollow plate having a first plate panel 860, a second plate panel 862, and a panel retainer 864 coupled to the first plate panel 860 and the second plate panel 862 as shown in FIGS. 11, and 12. The first plate panel 860 and the second plate panel 862 form opposed sides of each respective conduit 824, 834. The panel retainer 864 is welded around a perimeter of both the first and second plate panels 860, 862 to connect the plate panels 860, 862 to one another. The above ground portion 863 can have any suitable shape, such as cylindrical, square, rectangular, etc. and is coupled to both ends of the in-ground portion 861 and to the heat source 814 or the device 816, respectively. Although the above-ground portions 863 are illustratively shown coupled to an upper end of the in-ground portions 861, the above-ground portions 863 are preferably coupled to lateral ends of the in-ground portions 861 to facilitate burial of the conduits 824, 834 and packing the coal ash 19 around the conduits 824, 834.

The plate panels 860, 862 are at least partially spaced apart from one another to define a hollow interior 866 as shown in FIG. 12. The hollow interior 866 contains each respective working fluid 826, 836.

One or both of the plate panels 860, 862 may be formed to include a depression 868, 870 as shown in FIGS. 11 and 12. Each depression 868, 870 is a bend in the material forming the plate panel 860, 862 such that a portion of the plate panel 860, 862 projects into the hollow interior 866 toward the other plate panel 860, 862. The depressions 868, 870 are arranged in a grid along each plate panel 860, 862 and are spaced apart from one another. Each depression 868, 870 is aligned with a corresponding depression 868, 870 formed in the other plate panel 860, 862 and contacts a corresponding depression 868, 870 to block other portions of the plate panels 860, 862 from deforming toward one another, which could collapse the hollow interior 866 and hinder flow of the working fluid through the hollow interior 866. Each corresponding depression 868, 870 can be spot welded with one another in some embodiments.

One or both of the plate panels 860, 862 can also be formed to include projections 872, 874 as shown in FIG. 12. The projections 872, 874 are spaced apart from the depressions 868, 870 and extend away from the hollow interior 866. The projections 872, 874 increase the surface area of the plate panels 860, 862 to allow for more contact area between the conduits 824, 834 and the coal ash 19.

The shape and structure of the in-ground portions 863 of the conduits 824, 834 allows the in-ground portions 863 to have a contact area with a volume of the coal ash 19 of at least 2.5 in²/lb. In some embodiments, the contact area between the in-ground portions 863 of the conduits 824, 834 and the coal ash 19 is at least 5 in²/lb. In some embodiments, the contact area between the in-ground portions 863 of the conduits 824, 834 and the coal ash 19 is at least 10 in²/lb. In some embodiments, the contact area between the in-ground portions 863 of the conduits 824, 834 and the coal ash 19 is at least 15 in²/lb. In some embodiments, the contact area between the in-ground portions 863 of the conduits 824, 834 and the coal ash 19 is within a range of 2.5 in²/lb to 15 in²/lb. In some embodiments, the contact area between the in-ground portions 863 of the conduits 824, 834 and the coal ash 19 is within a range of 5 in²/lb to 15 in²/lb. In some embodiments, the contact area between the in-ground portions 863 of the conduits 824, 834 and the coal ash 19 is up to 100 in²/lb. Generally, the greater the contact area, the less time it takes to heat the coal ash 19 from a heat source and remove the heat from the coal ash 19. Any of the conduits described herein can have the contact area described above.

In illustrative embodiments, a method includes heating coal ash 19 to provide heated coal ash 19. The method further includes circulating a working fluid through the heated coal ash 19 to provide heated working fluid. The method further includes producing energy using the heated working fluid.

In some embodiments, the method includes burning coal to produce the coal ash 19 and residual heat. The residual heat can be used in an industrial process to boil water and/or produce a first power source. The method may further include transferring to the coal ash 19 to a landfill where it is stored as a thermal-storage mass. In some embodiments, at least some of the residual heat produced in the industrial process is also used to heat the coal ash 19 in the landfill and provide the heated coal ash. The thermal-storage mass stores the heat to be used by a device, such as a motor/generator that produces a second power source separate from the first power source.

A method in accordance with the present disclosure, can also include steps of preparing the coal ash 19 for use with any of the systems described previously. For example, the method can include retrofitting an existing coal ash landfill with any of the systems described previously. This can include one or more of: digging trenches in the coal ash 19; sifting the coal ash 19; laying conduits in the trenches; backfilling the trenches around the conduits with sifted coal ash 19 having desired particle size(s); and packing the coal ash around the conduits to a desired density.

In some embodiments, the coal ash 19 is packed to a density within a range of about 80 lbs/ft³ to about 120 lbs/ft³. In some embodiments, the coal ash 19 is packed to a density within a range of about 90 lbs/ft³ to about 110 lbs/ft³. In some embodiments, the coal ash 19 is packed to a density within a range of about 100 lbs/ft³ to about 150 lbs/ft³. In some embodiments, the coal ash 19 is packed to a density of about 100 lbs/ft³. In some embodiments, the coal ash 19 is packed to a density of at least 100 lbs/ft³. In some embodiments, the coal ash 19 is packed to a density of at least 90 lbs/ft³. In some embodiments, the coal ash 19 is packed to a density of at least 80 lbs/ft³. Such densities provide increased thermal conductivity of the coal ash 19 by packing the particles of the coal ash around and in contact with one another for conductive heat transfer.

The coal ash 19 can be packed in any suitable manner. If the coal ash 19 is located in a landfill spanning a large surface area, a vehicle, such as a footed compactor, can be used. In smaller systems, such as the housing 219 described previously, the coal ash 19 can be packed using a smaller vehicle or tool such as a tapper.

The method can include excavating trenches in the coal ash 19 and laying the in-ground portions 863 of the conduits 824, 826 in the trenches. The method then includes packing the coal ash around the in-ground portions 863 by applying pressure to the coal ash between the in-ground portions 863. The shape of the in-ground portions 863 allows the coal ash to be packed to the desired density without damaging the conduits 824, 834.

In some embodiments, the thermal-input systems described above can lack a working fluid and use a different form of heat input into the coal ash 19. For example, the conduit(s) included in the thermal input system and coupled to the heat source can include one or more electrically conductive heating elements interlaid into the coal ash and configured to input heat into the coal ash by resistive or Joule heating. In some embodiments, such heating elements can include an electrical conductor such as a metallic alloy, such as copper. For example, a copper foam or sponge can be used to both: (i) provide an electrical heating element and (ii) increase the contact area between the copper heating element and the coal ash 19 compared to a typical copper wire, for example.

In some embodiments, the present disclosure includes an in-ground coal ash thermal battery. A bottom liner separates ground from a thermal-storage mass, which includes coal ash. A top liner blocks rain water from getting into the coal ash. Together the top liner and bottom liner may satisfy EPA requirements for encapsulation and can facilitate the use of raw unprocessed coal ash for thermal storage and power production. At least one system of piping is used to transfer thermal energy into and or out of the coal ash. The system of piping can be in either a horizontal or vertical array, or a system of both horizontal and vertical array. The system of piping can transport heated fluid from the coal ash to a thermal device which can use the fluid that has been heated by the heat stored in the coal ash. The coal ash has a low thermal conductivity compared to thermal oil or glycol and therefore finned tubing or other methods of increasing area in thermal communication between the coal ash and the system of piping are an aspect of this disclosure.

The thermal-storage mass may consist of coal ash or consist essentially of coal ash such that substantially all of the materials within the thermal-storage mass is coal ash. The thermal-storage mass may consist essentially of coal-ash with trace amounts of other materials including earth, moisture, debris, or other trace particulates. In some embodiments, the thermal-storage mass consists essentially of coal ash and at least one working fluid selected from: a thermal oil, a mineral oil, and water.

In testing involving 700 pounds of coal ash with a temperature differential of 42 degrees, a temperature of the coal ash became uniform in about 16 hours. A thermal storage unit covering several acres in area and several feet deep may use a longer time to transfer heat from the inner to the outer portions of the coal ash. The long time required to move the heat throughout the ash may eliminate the need for an outer insulation layer.

In one aspect of the present disclosure, there is an electrical heating element in thermal communication with the coal ash used to input thermal energy into the coal ash. The system of piping can be used to transport a thermally conductive fluid through the coal ash to remove thermal energy.

In some embodiments, an in-ground coal ash thermal battery includes at least two systems of piping; i.e., a thermal input pipe and a thermal output pipe. In one aspect of the disclosure, the thermal input pipe is used to pump steam from a turbine of a power plant through the coal ash to provide thermal energy to the coal ash. In another aspect of the disclosure, the thermal input pipe is in thermal communication with a gas fired or other fossil fuel heat source. In another aspect of the disclosure, the thermal input pipe is in thermal communication with a solar power system or device. In another aspect of the disclosure, the thermal input pipe is in thermal communication with a waste heat source from an industrial process. The thermal output pipe contains a separate working fluid that is heated by the heat stored in the coal ash. The thermal output pipe exits the coal ash to transport the heated working fluid to a thermal device that can use the heated working fluid. One or more valves may be coupled to the thermal output pipe to control selective circulation of the working fluid.

In some embodiments, a vent allows moisture to exit the coal ash. In one aspect of this disclosure, the coal ash contains moisture. In some cases, the moisture is from rain during construction, for example. In other cases, the moisture is from a lack of drying of the coal ash when transferred from the coal ash pond to the coal ash thermal storage unit. As the coal ash is heated, the moisture can exit through the vent.

In some embodiments, a coal ash thermal battery can be contained in a container. The coal ash thermal battery includes of an interior volume of coal ash which is encapsulated by an exterior volume of insulation. Embedded within the interior volume of coal ash is a system of piping for transferring thermal energy into the Interior volume of coal ash. The system of piping has an inlet and an outlet. In one aspect thermal oil or glycol based fluid is pumped from a heat source and is circulated through the system of piping to input thermal energy into the interior volume of coal ash. In another aspect steam from a process of power plant is circulated through the system of piping. In another aspect the exhaust from the combustion of a fuel is circulated through the system of piping. A second system of piping is used to transfer thermal energy out of the interior volume of coal ash.

In some embodiments, the thermal energy storage system is contained within a shipping container. The thermal energy storage system may be easily shipped and installed in remote locations. In another aspect the thermal energy storage system is contained within a round tube. The round tube allows for case of installation when using a boring drill to bore a hole in the ground or coal ash land fill and insert the thermal energy storage system. In another aspect the thermal energy storage system is small enough to be used for residential storage of solar power. In another aspect the thermal energy storage system is 300 acres and many feet deep.

The coal ash can be screened prior to being placed in a landfill and packed selectively to increase thermal conductivity of the coal ash 19. For example, a screen may used to separate the coal ash by particle size. A first screen may have a ¼ mesh and may separate out everything over ¼ inch in size. A second screen may have a 1/16 mesh and separate out everything between 1/16 and ¼. In the process of separating the coal ash, the coal ash may be placed on the screen(s) and water may be poured over it to wash the smaller particles into a bucket. As the particles are washed into the bucket some of them may be very dense particles and may sink to the bottom of the bucket. Some of the particles may be suspended in the water to provide suspended particles.

Thermal conductivity of the coal ash 19 may be dependent on the amount of contact area between particles. In some embodiments, the greater the contact area, the greater the thermal conductivity. In the case of coal ash, larger particles can be placed adjacent tightly packed smaller particles, and the thermal conductivity of the larger particles may be similar to the smaller particles. Large particles and medium size particles may be suspended in a bed of the small particles such that there is great thermal conductivity throughout the mixture of coal ash and the various particles without having to separate the particles from one another.

This size distribution of particles of coal ash allows for the use of raw unprocessed coal ash in the thermal energy storage system. It is one object of the disclosure to be able to use raw, unprocessed coal ash as the thermal storage area of a thermal energy storage system. This may minimize the cost while maintaining the effectiveness of coal ash as a thermal storage material.

In some embodiments, a closed, insulated containment of coal ash includes a system of piping running through it and containing a circulating, heat-transfer fluid (liquid or gas). The heat-transfer fluid inputs heat from several sources (solar, natural gas fire, heat from manufacturing processes, surfaces of paved parking lots, wind, etc.) which heat the fluid. The heat-exchange fluid is then circulated throughout the coal ash where heat is transferred to and stored in the coal ash for later use. In this way, the coal ash may provide at least a portion of a thermal battery.

In some embodiments, also contained in the coal ash, is a separate system of piping that also is filled with a heat-transfer fluid. The heat-transfer fluid in the separate system of piping circulates through the separate system of piping and is heated by the coal ash. The separate system of piping can then transport the heated, heat-transfer fluid out of the coal ash at different or selective times for different uses with one or more thermal devices. Such uses can include use with a thermal to electric processor where electricity is produced, as a hot water and/or steam source, in which case the heat-transfer/working fluid includes water, a heating, ventilation, and cooling (HVAC) system, etc.

In some embodiments, coal ash is the ash that remains after burning coal, such as used to power coal powered electric plants or other large coal users. The container for the coal ash battery, if included, can be many sizes, from a 4 foot metal cube, a 20 or 40 foot shipping container, to a several acre, contained, in-ground unit all using coal ash as the heat conducting and storing agent.

The piping system may include two separate and close together systems of metal tubing that run back and forth through the coal ash and are filled with a slow moving fluid (of any suitable type, such as, thermal oil, glycol, antifreeze, Freon, ammonia, steam, air, nitrogen, $CO_2$, water, or any other suitable fluid). The input system takes in the heat source and heats up the coal ash and later the other system takes out the heated fluid for diverse uses.

In some embodiments, a $CO_2$ motor/generator system is configured to convert the heat stored in the coal ash thermal storage system into electricity, such as the system shown in FIG. 4. This system may allow for the input and storage of heat in the coal ash thermal storage system and the output of electricity by the $CO_2$ motor/generator. The thermal storage system and $CO_2$ motor/generator become a thermal battery. A high pressure $CO_2$ storage tank may be connected to a heat exchanger through a connecting tube. The heat exchanger has a thermal fluid inlet and a thermal fluid outlet. Heat from the coal ash thermal storage system is transferred to the heat exchanger via flow of a thermal fluid through the thermal output pipe from the coal ash and to the heat exchanger. The heat exchanger has a $CO_2$ inlet and a $CO_2$ outlet. The heat exchanger provides mechanical isolation and thermal communication between the thermal fluid and the $CO_2$. The $CO_2$ outlet connects to a regulator. The regulator is connected to a $CO_2$ motor that drives a generator to make electricity.

A high pressure $CO_2$ storage cylinder, such as the cylinder shown in FIG. 4, can store $CO_2$ in liquid form at pressures between 500 PSI and 900 PSI. Temperature has an effect on the pressure of the $CO_2$. At 40 degrees F. the pressure in the $CO_2$ storage tank is about 600 PSI. At 160 degrees F. the pressure in the $CO_2$ storage tank increases to about 1000 PSI. Generally, as the temperature increases the pressure increases. In operation the $CO_2$ flows from the $CO_2$ storage tank through the heat exchanger to the regulator. When the thermal fluid passes through the heat exchanger the $CO_2$ is heated and the pressure of the system increases. Some regulators can handle up to 4500 PSI system pressure and regulate it down to 100 PSI for the $CO_2$ motor. The increased pressure of the system may reduce the mass of $CO_2$ passing through the regulator to create the 100 PSI for the $CO_2$ motor. The heat from the coal ash thermal storage system is absorbed by the $CO_2$ and results in longer run times for a given mass of stored $CO_2$. Heat absorbed by the $CO_2$ is converted into electricity when the heated $CO_2$ passes through the motor/generator.

FIG. 5 shows a $CO_2$ motor/generator where the coal ash is used as the heat exchanger. The system of piping is in thermal communication with the interior volume of coal ash. Heat transfer fluid flowing through the system of piping delivers heat to the interior volume of coal ash for storage. The second system of piping is in thermal communication with the interior volume of coal ash. $CO_2$ from the storage tank flows through the second system of piping. The second system of piping provides mechanical isolation and thermal communication between the interior volume of coal ash and the $CO_2$ flowing through the system. As the $CO_2$ absorbs heat it expands and increases pressure. The $CO_2$ then exits the second system of piping and flows through the regulator to the $CO_2$ motor. In this aspect, the external heat exchanger shown in FIG. 4 is omitted and incorporated into the second system of piping and coal ash.

FIG. 6 shows a coal ash thermal storage system with $CO_2$ recovery. A solar panel is electrically connected by wires to a low pressure $CO_2$ storage tank equipped with a compressor designed to capture the $CO_2$ exiting the $CO_2$ motor/generator and recompress the $CO_2$ into the high pressure storage tanks. A 4-port valve switches to allow the first tank to empty while the second tank is being filled. Similarly, valve can allow the second tank to empty while the first tank is being filled.

FIG. 7 shows a coal ash thermal storage system with adiabatic $CO_2$ recovery. The volume of coal ash has at least 3 sections. The system of piping is contained within at least one of the sections but not all, at least in this example. The second system of piping flows through all sections of the coal ash volume (405). A third system of piping is contained within the coal ash volume sections in two of the sections with the first and second systems of piping.

In one aspect, $CO_2$ exits the high pressure storage tank and passes through the second system of piping through all three section to the regulator. $CO_2$ exits the low pressure storage tank equipped with a compressor and passes through the third system of piping as it is compressed back into the coal ash and then eventually fills the second high pressure tank. When $CO_2$ is compressed above 860 psi at 70 F it typically converts to a liquid. During the phase change from a gas to a liquid latent heat can be removed from the $CO_2$ at constant temperature to facilitate the phase change. Similarly when the liquid $CO_2$ exits a tank, it can absorb heat to facilitate the phase change from a liquid to a gas. In one aspect, the fluid within the second system of piping absorbs latent heat from the third system of piping.

In the section(s) of the volume of coal ash with the third system of piping, latent heat is transferred from the third system of piping to the second system of piping. The $CO_2$ in the second system of piping in that section(s) of the coal ash is in liquid state as it exits tank. As it expands through the second system of piping it may become very cold. In one aspect, it has a temperature of −100 F. The CO2 absorbs heat energy from the coal ash in the section with the third system of piping and causes the coal ash to become very cold. When the CO2 is compressed in the third system of piping it becomes heated. The cold coal ash can absorb the heat from the CO2 in the third system of piping. The removal of latent heat necessary to cause the phase change from a gas to a liquid in the third system of piping is matched with the absorption of latent heat necessary to cause the phase change from a liquid to a gas in the second system of piping. The section of the coal ash volume with the third system of piping is cold and allows the flow of latent heat between the second system of piping and the third system of piping without loss of heat to the atmosphere. The coal ash in section with the third system of piping provides a thermal barrier to the atmosphere and facilitates adiabatic CO2 recovery.

In the second section of the coal ash volume the coal ash is at a medium temperature. Latent heat is transferred between the second system of piping and the third system of piping in this section to continue the adiabatic CO2 recovery process.

In the section of the coal ash volume with the first system of piping, heat from the first system of piping is transferred to the second system of piping, heating the CO2 to a high temperature. The CO2 motor/generator is more efficient and converts the heat absorbed into electricity. Generally, when a gas is compressed it heats up and when it expands it cools down. In some embodiments, the process includes heating the CO2 passing through the CO2 motor/generator to a temperature that will result in a cooling of the gas exiting the motor/generator to ambient temperature, thereby resulting in no heat loss to the atmosphere and a greater efficiency of converting heat into electricity.

The heat absorbed in section can also be used to recapture and compress the CO2 in a CO2 motor/compressor. In some embodiments, the present disclosure includes a CO2 motor/generator to make electricity and a CO2 motor/compressor to recapture a portion of the CO2 in the system.

A rotor in a CO2 motor is shown in FIGS. 8 and 9 showing the rotor mounted inside a housing. Each rotor hole aligns with a housing inlet where heated working fluid is injected into the motor. The interior wall of the housing and rotor hole form a closed, fluid-tight volume. When CO2 passes through the housing inlet and into one of the holes the hydraulic pressure between the hole and interior wall creates rotational torque on the rotor and drives rotation of the rotor. As the rotor turns, the CO2 exits the housing outlet. The rotor can be attached to a generator to generate electricity. The clearance between the rotor outer surface area and housing may be 0.05 inches and provides restriction to loss of CO2 from the holes.

In one aspect, the inlet leading to the rotor may be 0.125 inches in diameter. The momentum exchange between the CO2 and the rotor can be described by the equation $E = \frac{1}{2} MV^2$. When CO2 exists a high pressure storage tank with no heating it may exit the housing outlet at about O2 flow and is heated prior to driving the rotor as it expands and becomes less dense and its mass drops. However, the velocity of the gas increases during this processes. This results in greater efficiency and power due to the velocity being a square or exponential factor and the mass being a linear factor in the equation above.

In one aspect, the rotor may be 5 inches in diameter and 0.625 inches thick. The rotor is formed to include holes or bores which may be 0.3125 inches in diameter in one example. The housing inlet may be 0.125 inches in diameter. The housing outlet increases from 0.3125 inches near the rotor to 0.625 inch in diameter at the exit of the housing. In another aspect the rotor is 24 inches in diameter and 6 inches thick. There may be multiple rows of holes across the width of the rotor. In FIG. 9, it can be seen that the holes are smaller than the width of the rotor. There is an outer surface area of the rotor between the holes and the outside of the rotor. The holes are encapsulated by the outer surface area of the rotor.

In some power plants burning coal, gas, or nuclear, a steam turbine may be used to generate electricity. Typical steam input temperatures can be 1000 degrees F. and typical steam outlet temperatures can be 600 degrees F. The 600 degree F. steam is cooled to below 212 F so that it can return to a liquid and then be pumped. In some examples, about 50% of the energy created to reach the 1000 F steam is lost in the condensing cycle. A solar thermal system may use the same steam turbine as a power plant but would still need to deliver 1000 degree F. steam to the turbine. In such examples, complex molten salt can be used to transfer the heat from the solar panel to the turbine. The present disclosure uses working fluid(s) at a lower temperature to drive a rotor, and hence, less energy, compared to such systems.

In illustrative embodiments, the coal ash includes or consists essentially of bottom ash, fly ash, and flue gas desulfurization solids. In illustrative embodiments, the coal ash includes or consists essentially of bottom ash. In illustrative embodiments, the coal ash includes or consists essentially of fly ash. In illustrative embodiments, the coal ash includes or consists essentially of flue gas desulfurization solids. In illustrative embodiments, the coal ash includes or consists essentially of any combination of bottom ash, fly ash, and flue gas desulfurization solids.

In one aspect, the heat source can include solar. In another aspect, the heat source can include waste heat from an industrial application/process. In another aspect, the heat source can include a second coal ash battery. In another aspect, the heat source can include heat from the earth or atmosphere. In another aspect, the heat source can include the combustion of carbon or hydrogen based fuels.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

While the methods, equipment and systems have been described in connection with specific embodiments, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Unless otherwise indicated, the drawings are intended to be read (for example, cross-hatching, arrangement of parts, proportion, degree, or the like) together with the specification, and are to be considered a portion of the entire written description of this disclosure. As used in the following description, the terms "horizontal", "vertical", "left", "right", "up" and "down", "upper" and "lower" as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. It should further be noted that any patents, applications and publications referred to herein are incorporated by reference in their entirety.

What is claimed is:

1. A thermal energy system, comprising:
a heat source configured to produce heat;
a device configured to use the heat produced by the heat source to produce energy; and
a thermal battery configured to store the heat produced by the heat source and transfer the heat to the device for use by the device, the thermal battery comprising:
a thermal-storage mass configured to store heat from the heat source;
a thermal-input system configured to input the heat into the thermal-storage mass for storage in the thermal-storage mass; and
a thermal-output system configured to output the heat from the thermal-storage mass to the device,
wherein the thermal-storage mass includes coal ash,
wherein the thermal-input system includes a first conduit coupled to the heat source and extending through the thermal-storage mass and a first working fluid contained within the first conduit and configured to circulate from the heat source, through the first conduit, and back to the heat source,
wherein the thermal-output system includes a second conduit coupled to the device and extending through the thermal-storage mass separately from the first conduit and a second working fluid contained within the second conduit and configured to circulate through the second conduit from the thermal-storage mass, to the device, and back into the thermal-storage mass, and
wherein at least one of the first conduit and the second conduit includes an above ground portion having a first cross-sectional shape and a plurality of in-ground portions having an elongated, plate-like cross-sectional shape, the plurality of in-ground portions being arranged vertically and in parallel relation to one another in the thermal-storage mass.

2. The thermal energy system of claim 1, wherein the thermal-output system further includes a working fluid reservoir configured to contain the second working fluid in a compressed state, a valve configured to meter release of the second working fluid from the working fluid reservoir and into the thermal-storage mass, and a regulator coupled to the second conduit between the thermal-storage mass and the device to control release of the second working fluid from the thermal-storage mass to the device after being heated in the thermal-storage mass.

3. The thermal energy system of claim 2, wherein the second working fluid includes carbon dioxide and the carbon dioxide is configured to change from a liquid state in the working fluid reservoir to a gas state in the thermal-storage mass for use by the device in the gas state.

4. The thermal energy system of claim 2, wherein the thermal-output system further includes a compressor between the device and the working fluid reservoir and the compressor is configured to change the second working fluid from a gas state to a liquid state after flowing through the device.

5. The thermal energy system of claim 4, wherein the thermal-output system further includes a second working fluid reservoir and the valve is a multi-port valve configured to selectively open and close the working fluid reservoir and the second working fluid reservoir to provide means for filling a first reservoir, included in the working fluid reservoir and the second working fluid reservoir, with compressed second working fluid from the compressor and releasing the first working fluid from a second reservoir, included in the working fluid reservoir and the second working fluid reservoir.

6. The thermal energy system of claim 5, wherein the thermal-storage mass includes a first section, a second section spaced apart from the first section, and a third section spaced apart from the first section and the second section, and wherein the second conduit extends through the third section, and the first conduit includes: (i) a first segment extending from the working fluid reservoir and through the first section, the second section, and the third section to receive heat in the first section, the second section, and the third section, and (ii) a second segment extending from the compressor into the thermal-storage mass at the second section and through the second section and the first section with the first segment and to the working fluid reservoir or the second working fluid reservoir to heat the thermal-storage mass and the first working fluid in the first section and second section.

23

7. A thermal battery, comprising:

a thermal-storage mass consisting essentially of coal ash and configured to store heat from a heat source;

a conduit extending through the thermal-storage mass; and a working fluid contained in the conduit and configured to transfer heat to or from the thermal-storage mass, wherein the conduit is a first conduit included in a thermal-input system configured to input the heat from the heat source into the thermal-storage mass for storage in the thermal-storage mass, and the thermal battery further includes a thermal-output system configured to output the heat from the thermal-storage mass to a device, the thermal-output system includes a second conduit coupled to the device and extending through the thermal-storage mass separately from the first conduit and a second working fluid contained within the second conduit and configured to circulate through the second conduit from the thermal-storage mass, to the device, and back into the thermal-storage mass, wherein the thermal-output system further includes a working fluid reservoir configured to contain the second working fluid in a compressed state, a valve configured to meter release of the second working fluid from the working fluid reservoir and into the thermal-storage mass, and a regulator coupled to the second conduit between the thermal-storage mass and the device to control release of the second working fluid from the thermal-storage mass to the device after being heated in the thermal-storage mass, wherein the thermal-output system further includes a compressor between the device and the working fluid reservoir and the compressor is configured to change the second working fluid from a gas state to a liquid state after flowing through the device, wherein the thermal-output system further includes a second working fluid reservoir and the valve is a multi-port valve configured to selectively open and close the working fluid reservoir and the second working fluid reservoir to provide means for filling a first reservoir, included in the working fluid reservoir and the second working fluid reservoir, with compressed second working fluid from the compressor and releasing the second working fluid from a second reservoir, included in the working fluid reservoir and the second working fluid reservoir.

8. The thermal battery of claim 7, wherein the second working fluid includes carbon dioxide and the carbon dioxide is configured to change from a liquid state in the working fluid reservoir to a gas state in the thermal-storage mass for use by the device in the gas state.

9. The thermal energy system of claim 7, wherein the thermal-storage mass includes a first section, a second section spaced apart from the first section, and a third section spaced apart from the first section and the second section, and wherein the first conduit extends through the third section, the second conduit includes: (i) a first segment extending from the working fluid reservoir and through the first section, the second section, and the third section to receive heat in the first section, the second section, and the third section, and (ii) a second segment extending from the compressor into the thermal-storage mass at the second section and through the second section and the first section to the working fluid reservoir or the second working fluid reservoir to heat the thermal-storage mass and the second working fluid in the first segment.

10. A method comprising:

heating coal ash to provide heated coal ash, circulating a working fluid through the heated coal ash to provide heated working fluid, producing energy using the heated working fluid, and burning coal to produce the coal ash and residual heat, and transferring to the coal ash and the residual heat to a coal ash landfill to heat the coal ash in the coal ash landfill and provide the heated coal ash.

11. The method of claim 10, wherein the working fluid changes from a liquid state to a gas state as the working fluid is heated by the heated coal ash and producing energy from using the heated working fluid includes discharging the heated working fluid into a motor to cause rotation of a rotor included in a generator.

12. The method of claim 11, further comprising compressing the heated working fluid from the gas state to the liquid state after producing energy using the heated working fluid and recirculating the working fluid in the liquid state back to the coal ash.

13. The method of claim 12, wherein the coal ash includes a first section, a second section spaced apart from the first section, and a third section spaced apart from the first section and the second section, and wherein the method includes circulating the working fluid through the first section, the second section and the third section from to provide the heated working fluid and reintroducing the working fluid into the second section and the first section after compressing the working fluid back to the liquid state.

* * * * *